United States Patent
Hattori et al.

(10) Patent No.: US 9,365,772 B2
(45) Date of Patent: Jun. 14, 2016

(54) COMPOUND, LIQUID CRYSTAL COMPOSITION AND LIQUID CRYSTAL DISPLAY DEVICE

(75) Inventors: Norikatsu Hattori, Chiba (JP); Yasuhiro Haseba, Chiba (JP); Shin-Ichi Yamamoto, Chiba (JP)

(73) Assignees: JNC CORPORATION, Tokyo (JP); JNC PETROCHEMICAL CORPORTION, Tokyo (JP)

( * ) Notice: Subject to any disclaimer, the term of this patent is extended or adjusted under 35 U.S.C. 154(b) by 0 days.

(21) Appl. No.: 14/344,605

(22) PCT Filed: Sep. 11, 2012

(86) PCT No.: PCT/JP2012/073152
§ 371 (c)(1),
(2), (4) Date: Mar. 13, 2014

(87) PCT Pub. No.: WO2013/039051
PCT Pub. Date: Mar. 21, 2013

(65) Prior Publication Data
US 2014/0339471 A1    Nov. 20, 2014

(30) Foreign Application Priority Data
Sep. 14, 2011   (JP) .................. 2011-200818

(51) Int. Cl.
*G02F 1/1333* (2006.01)
*C09K 19/34* (2006.01)
*C09K 19/04* (2006.01)

(52) U.S. Cl.
CPC ..... *C09K 19/3402* (2013.01); *C09K 2019/0466* (2013.01); *C09K 2019/3422* (2013.01)

(58) Field of Classification Search
CPC .................. G02F 1/1333; C09K 2019/0466; C09K 2019/3422; C09K 19/3402
USPC ............... 252/299.01, 299.6, 299.61, 299.63; 428/1.1; 349/183
See application file for complete search history.

(56) References Cited

U.S. PATENT DOCUMENTS

| 6,315,922 | B1 | 11/2001 | Takeshita et al. |
| 7,879,414 | B2 * | 2/2011 | Saito .................. C09K 19/3402 252/299.61 |
| 8,337,718 | B2 * | 12/2012 | Goto et al. ................. 252/299.6 |
| 8,574,456 | B2 * | 11/2013 | Wittek et al. ............. 252/299.66 |
| 8,715,527 | B2 * | 5/2014 | Luessem et al. ......... 252/299.61 |
| 2011/0001089 | A1 | 1/2011 | Wittek et al. |
| 2011/0042615 | A1 | 2/2011 | Luessem et al. |
| 2011/0180756 | A1 | 7/2011 | Goto et al. |
| 2012/0099039 | A1 | 4/2012 | Haseba et al. |

FOREIGN PATENT DOCUMENTS

| JP | 2001-003053 | 1/2001 |
| JP | 2011-510112 | 3/2011 |
| JP | 2011-514410 | 5/2011 |
| JP | 2011-153202 | 8/2011 |
| WO | 2010/134430 | 11/2010 |

OTHER PUBLICATIONS

"International Search Report (Form PCT/ISA/210)", mailed on Dec. 18, 2012, pp. 1-4.

* cited by examiner

*Primary Examiner* — Geraldina Visconti
(74) *Attorney, Agent, or Firm* — Jianq Chyun IP Office

(57) ABSTRACT

A liquid crystal composition is described, which has a nematic phase and contains a compound having a high maximum temperature and a large dielectric anisotropy as a first component, and a specific compound having a large dielectric anisotropy as a second component, and may also contain a specific compound having a large dielectric anisotropy as a third component, and a compound having a small viscosity as a fourth component. An AM liquid crystal display device including the composition is also described.

19 Claims, No Drawings

COMPOUND, LIQUID CRYSTAL COMPOSITION AND LIQUID CRYSTAL DISPLAY DEVICE

CROSS-REFERENCE TO RELATED APPLICATION

This application is a 371 application of the International PCT application serial no. PCT/JP2012/073152, filed on Sep. 11, 2012, which claims priority benefits of Japan Patent Application No. 2011-200818, filed on Sep. 14, 2011. The entirety of each of the above-mentioned patent applications is hereby incorporated by reference herein and made a part of this specification.

TECHNICAL FIELD

The invention relates to a liquid crystal composition mainly suitable for use in an active matrix (AM) device and so forth, and an AM device and so forth including the composition. In particular, the invention relates to a liquid crystal composition having a positive dielectric anisotropy, and a device and so forth that include the composition and have a twisted nematic (TN) mode, an optically compensated bend (OCB) mode, an in-plane switching (IPS) mode, a fringe field switching (FFS) mode, a polymer sustained alignment (PSA) mode or a field induced photo-reactive alignment (FPA) mode.

BACKGROUND ART

For liquid crystal display devices, the classification based on the operating mode of liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode, a polymer sustained alignment (PSA) mode and a field induced photo-reactive alignment (FPA) mode, etc. The classification based on the driving mode of the device includes passive matrix (PM) and active matrix (AM) types. The PM types are classified into static type, multiplex type and so forth, and the AM types are classified into thin film transistor (TFT) types, metal insulator metal (MIM) types and so forth. The TFT types are further classified into amorphous silicon and polycrystal silicon types, wherein the latter is classified into a high temperature type and a low temperature type according to the production process. The classification based on the light source includes a reflective type utilizing natural light, a transmissive type utilizing a backlight, and a transflective type utilizing both the natural light and a backlight.

The devices include a liquid crystal composition having suitable characteristics. The liquid crystal composition has a nematic phase. General characteristics of the composition should be improved to obtain an AM device having good general characteristics. Table 1 below summarizes the relationship between the general characteristics of the two aspects. The general characteristics of the composition will be further explained based on a commercially available AM device. The temperature range of the nematic phase relates to the temperature range in which the device can be used. A preferred maximum temperature of the nematic phase is about 70° C. or higher, and a preferred minimum temperature of the nematic phase is about 0° C. or lower. The viscosity of the composition relates to the response time of the device. A short response time is preferred for displaying moving images on the device. Accordingly, a small viscosity of the composition is preferred. A small viscosity at a low temperature is further preferred. The elastic constant of the composition relates to the contrast of the device. In order to increase the contrast of the device, a large elastic constant in the composition is further preferred.

TABLE 1

General Characteristics of Composition and AM Device

| No. | General Characteristics of Composition | General Characteristics of AM Device |
|---|---|---|
| 1 | Wide temperature range of a nematic phase | Wide usable temperature range |
| 2 | Small viscosity[1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

[1]A liquid crystal composition can be injected into a liquid crystal cell in a shorter period of time.

The optical anisotropy of the composition relates to the contrast ratio of the device. The product ($\Delta n \times d$) of the optical anisotropy ($\Delta n$) of the composition and the cell gap (d) of the device is designed so as to maximize the contrast ratio. A suitable value of the product depends on the type of the operating mode. In a device having a mode such as TN, the suitable value is about 0.45 µm. In the above case, a composition having a large optical anisotropy is preferred for a device having a small cell gap. A large dielectric anisotropy of the composition contributes to a low threshold voltage, a small electric power consumption and a large contrast ratio of the device. Accordingly, a large dielectric anisotropy is preferred. A large specific resistance of the composition contributes to a large voltage holding ratio, and the large voltage holding ratio contributes to a large contrast ratio of the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. The stability of the composition to ultraviolet light and heat relates to the service life of the liquid crystal display device. In a case where the stability is high, the device has a long service life. Such characteristics are preferred for an AM device for use in a liquid crystal projector, a liquid crystal television and so forth. A large elastic constant of the composition contributes to a large contrast ratio and a short response time of the device. Accordingly, a large elastic constant is preferred.

A composition having a positive dielectric anisotropy is used for an AM device having a TN mode. On the other hand, a composition having a negative dielectric anisotropy is used for an AM device having a VA mode. A composition having a positive or negative dielectric anisotropy is used for an AM device having an IPS mode or a FFS mode. A composition having a positive or negative dielectric anisotropy is used for an AM device having a PSA mode or a FPA mode. A liquid crystal composition having a positive dielectric anisotropy is disclosed in Patent literature No. 1 to No. 3.

CITATION LIST

Patent Literature

Patent literature No. 1: JP 2001-003053 A.
Patent literature No. 2: JP 2011-153202 A.
Patent literature No. 3: JP 2011-514410 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of nematic phase, a low minimum temperature of nematic phase, a small viscosity, a suitable optical anisotropy, a large dielectric anisotropy, a large specific resistance, a high stability to ultraviolet light, a high stability to heat and a large elastic constant, etc.

SUMMARY OF INVENTION

Technical Problem

An object of the invention is to provide a liquid crystal composition satisfying at least one of characteristics such as a high maximum temperature of nematic phase, a low minimum temperature of nematic phase, a small viscosity, a suitable optical anisotropy, a large dielectric anisotropy, a low threshold voltage, a large specific resistance, a high stability to ultraviolet light, a high stability to heat and a large elastic constant. Another object is to provide a liquid crystal composition having a suitable balance between at least two of the characteristics. A further object is to provide a liquid crystal display device including such a composition. An additional object is to provide a composition having a suitable optical anisotropy, a large dielectric anisotropy, a low threshold voltage, a high stability to ultraviolet light, a large elastic constant and so forth, and to provide an AM device having a short response time, a large voltage holding ratio, a large contrast ratio, a long service life and so forth.

Solution to Problem

The solution is a liquid crystal composition that has a nematic phase and contains at least one compound selected from the group of compounds represented by formula (1) as a first component and at least one compound selected from the group of compounds represented by formula (2) as a second component, in which the proportion of the first component is in the range of 25 wt % to 85 wt % based on the total weight of the liquid crystal composition, and a liquid crystal display device includes the composition;

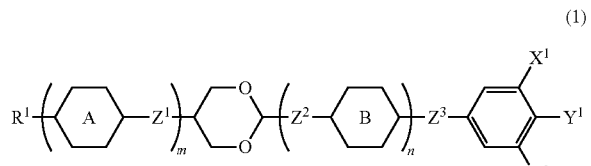

(1)

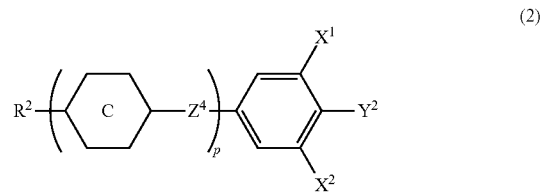

(2)

wherein $R^1$ and $R^2$ are independently alkyl having 1 to 12 carbons, alkoxy having 1 to 12 carbons, or alkenyl having 2 to 12 carbons; ring A, ring B and ring C are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 2,6,7-trioxabicyclo[2.2.2]octane-1,4-diyl or tetrahydropyran-2,5-diyl; $X^1$ and $X^2$ are independently hydrogen or fluorine; $Y^1$ and $Y^2$ are independently fluorine, chlorine, trifluoromethyl or trifluoromethoxy; $Z^1$, $Z^2$, $Z^3$ and $Z^4$ are independently a single bond, ethylene, carbonyloxy or difluoromethyleneoxy; m and n are 0, 1, 2 or 3, and the sum of m and n is 2 or 3; and p is 1, 2, 3 or 4.

Advantageous Effects of Invention

An advantage of the invention is a liquid crystal composition satisfying at least one of characteristics such as a high maximum temperature of nematic phase, a low minimum temperature of nematic phase, a small viscosity, a suitable optical anisotropy, a large dielectric anisotropy, a low threshold voltage, a large specific resistance, a high stability to ultraviolet light, a high stability to heat and a large elastic constant. One aspect of the invention is a liquid crystal composition having a suitable balance between at least two of the characteristics. Another aspect is a liquid crystal display device including such a composition. A further aspect is a composition having a suitable optical anisotropy, a large dielectric anisotropy, a low threshold voltage, a high stability to ultraviolet light, a large elastic constant and so forth, and an AM device having a short response time, a large voltage holding ratio, a large contrast ratio, a long service life and so forth.

DESCRIPTION OF EMBODIMENTS

The usage of terms herein is as described below. A liquid crystal composition or a liquid crystal display device of the invention may be occasionally abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound or a polymerizable compound may be occasionally added to the composition. Even in the case where the compounds are liquid crystalline, the compounds are classified as an additive herein. At least one compound selected from the group of compounds represented by formula (1) may be occasionally abbreviated as "compound (1)." "Compound (1)" means one compound or two or more compounds represented by formula (1). The same rule applies to any other compound represented by any other formula. "At least one" in the context of "replaced" means that positions and numbers can be freely selected.

The maximum temperature of nematic phase may be occasionally abbreviated as "maximum temperature." The minimum temperature of nematic phase may be occasionally abbreviated as "minimum temperature." The expression "having a large specific resistance" means that the composition has a large specific resistance at room temperature and also at a temperature close to the maximum temperature of nematic phase in an initial stage, and that the composition has a large specific resistance at room temperature and also at a temperature close to the maximum temperature of nematic phase even after the device has been used for a long period of time. The expression "having a large voltage holding ratio" means that the device has a large voltage holding ratio at room temperature and also at a temperature close to the maximum temperature of nematic phase in an initial stage, and that the device has a large voltage holding ratio at room temperature and also at a temperature close to the maximum temperature of the nematic phase even after the device has been used for a long period of time. When characteristics such as an optical anisotropy are explained, the values obtained according to the measuring methods described in Examples will be used. A first component includes one compound or two or more compounds. "Proportion of the first component" is expressed in terms of weight percent (wt %) of the first component based on the total weight of the liquid crystal composition. The proportions of the second component and so forth are expressed in a similar way. The proportion of the additive mixed with the composition is expressed in terms of weight percent (wt %) or weight parts per million (ppm) based on the total weight of the liquid crystal composition.

The symbol $R^1$ is used for plural compounds in the chemical formulas of component compounds. The groups selected for arbitrary two $R^1$ in the compounds may be identical or different. In a case, for example, $R^1$ of compound (1) is ethyl and $R^1$ of compound (1-1) is ethyl. In another case, $R^1$ of compound (1) is ethyl and $R^1$ of compound (1-1) is propyl. The same rule applies to symbols $X^1$, $Y^1$ and so on.

The invention includes the items described below.

Item 1 is a liquid crystal composition that has a nematic phase and contains at least one compound selected from the group of compounds represented by formula (1) as a first component and at least one compound selected from the group of compounds represented by formula (2) as a second component, in which the proportion of the first component is in the range of 25 wt % to 85 wt % based on the total weight of the liquid crystal composition:

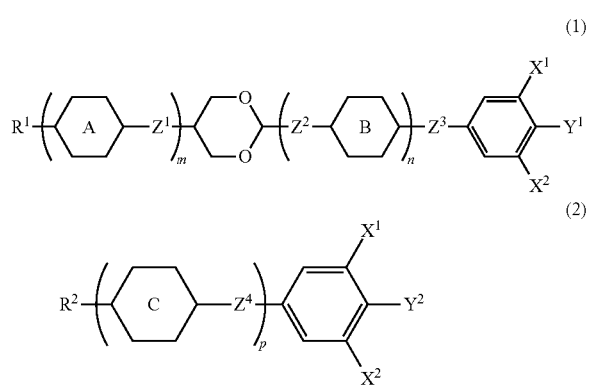

wherein $R^1$ and $R^2$ are independently alkyl having 1 to 12 carbons, alkoxy having 1 to 12 carbons, or alkenyl having 2 to 12 carbons; ring A, ring B and ring C are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 2,6,7-trioxabicyclo[2.2.2]octane-1,4-diyl or tetrahydropyran-2,5-diyl; $X^1$ and $X^2$ are independently hydrogen or fluorine; $Y^1$ and $Y^2$ are independently fluorine, chlorine, trifluoromethyl or trifluoromethoxy; $Z^1$, $Z^2$, $Z^3$ and $Z^4$ are independently a single bond, ethylene, carbonyloxy or difluoromethyleneoxy; m and n are 0, 1, 2 or 3, and the sum of m and n is 2 or 3; and p is 1, 2, 3 or 4.

Item 2 is the liquid crystal composition of item 1 which has the nematic phase and contains at least one compound selected from the group of compounds represented by formula (1) as the first component and at least one compound selected from the group of compounds represented by formula (2) as the second component, in which the proportion of the first component is in the range of 25 wt % to 80 wt % based on the total weight of the liquid crystal composition:

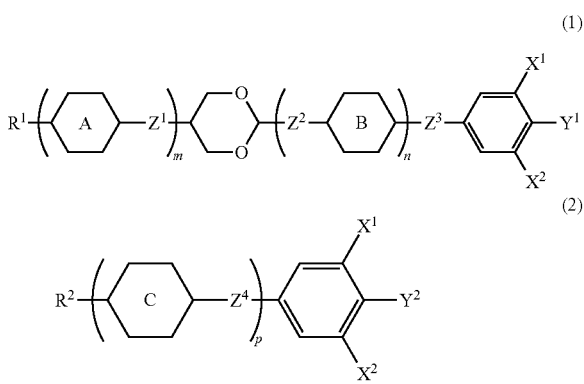

wherein $R^1$ and $R^2$ are independently alkyl having 1 to 12 carbons, alkoxy having 1 to 12 carbons, or alkenyl having 2 to 12 carbons; ring A, ring B and ring C are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 2,6,7-trioxabicyclo[2.2.2]octane-1,4-diyl or tetrahydropyran-2,5-diyl; $X^1$ and $X^2$ are independently hydrogen or fluorine; $Y^1$ and $Y^2$ are independently fluorine, chlorine, trifluoromethyl or trifluoromethoxy; $Z^1$, $Z^2$, $Z^3$ and $Z^4$ are independently a single bond, ethylene, carbonyloxy or difluoromethyleneoxy; m and n are 0, 1, 2 or 3, and the sum of m and n is 2 or 3; and p is 1, 2, 3 or 4.

Item 3 is the liquid crystal composition of item 1 or 2 in which the first component is at least one compound selected from the group of compounds represented by formula (1-1) to formula (1-5):

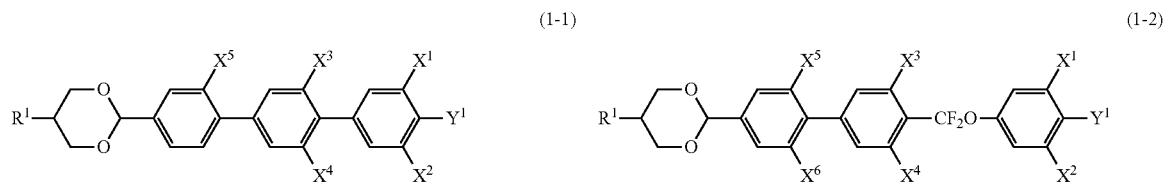

(1-3)

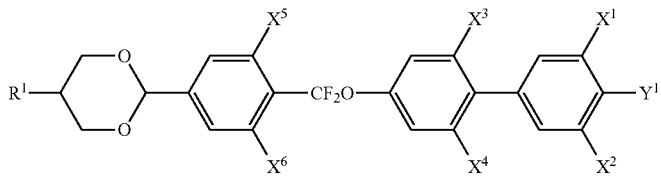

(1-4)

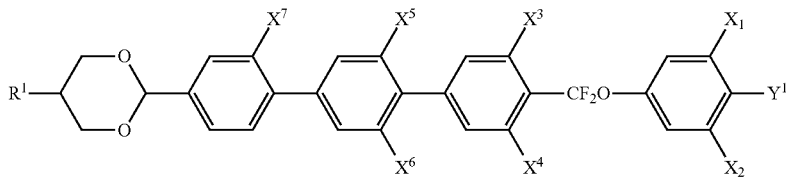

(1-5)

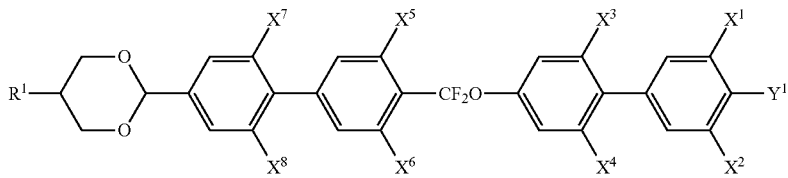

wherein $R^1$ is alkyl having 1 to 12 carbons, alkoxy having 1 to 12 carbons, or alkenyl having 2 to 12 carbons; $X^1, X^2, X^3, X^5, X^6, X^7$ and $X^8$ are independently hydrogen or fluorine; and $Y^1$ is fluorine, chlorine, trifluoromethyl or trifluoromethoxy.

Item 4 is the liquid crystal composition of item 1 or 2 in which the first component is at least one compound selected from the group of compounds represented by formula (1-1) of item 3.

Item 5 is the liquid crystal composition of item 1 or 2 in which the first component is at least one compound selected from the group of compounds represented by formula (1-2) of item 3.

Item 6 is the liquid crystal composition of item 1 or 2 in which the first component is at least one compound selected from the group of compounds represented by formula (1-3) of item 3.

Item 7 is the liquid crystal composition of any one of items 1 to 6 in which the second component is at least one compound selected from the group of compounds represented by formulas (2-1) to (2-20):

(2-1)

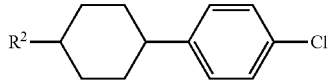

(2-2)

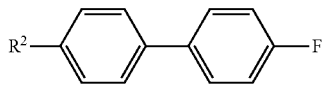

(2-3)

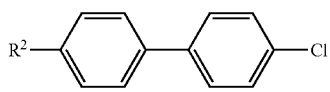

(2-4)

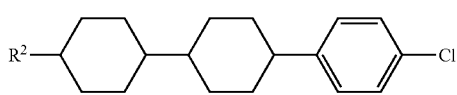

-continued (2-5)

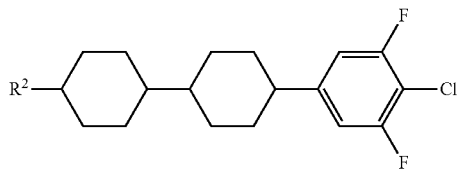

(2-6)

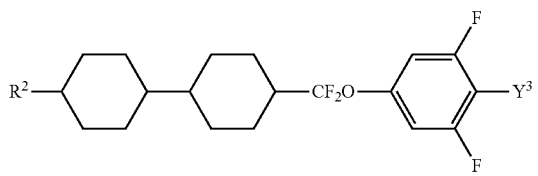

(2-7)

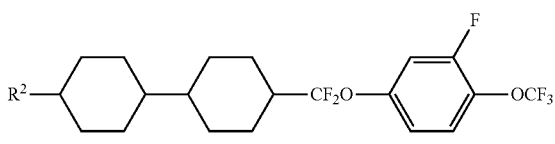

(2-8)

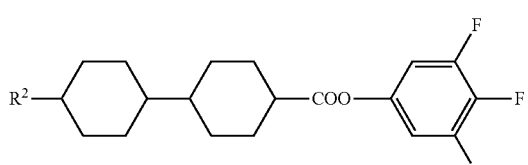

(2-9)

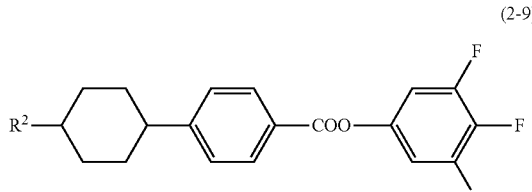

-continued (2-10)
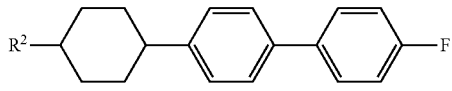

(2-11)
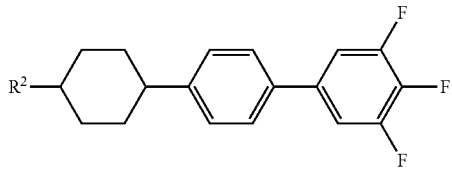

(2-12)
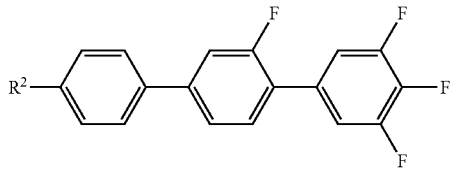

(2-13)
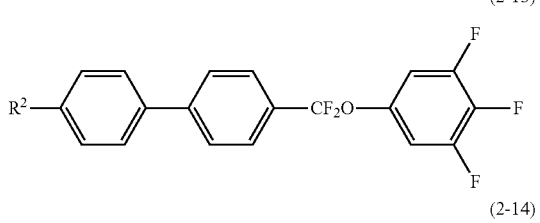

(2-14)
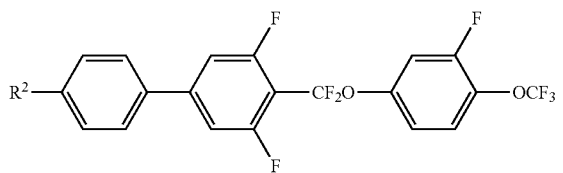

(2-15)
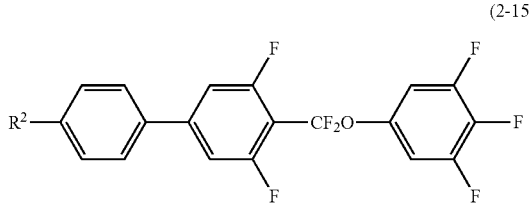

(2-16)
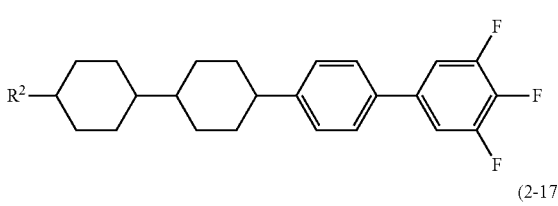

(2-17)
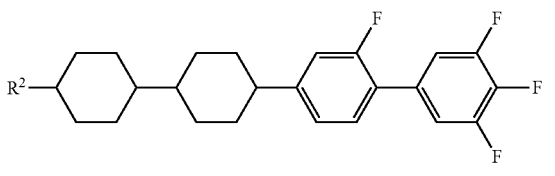

(2-18)
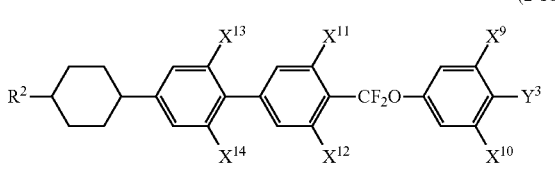

(2-19)
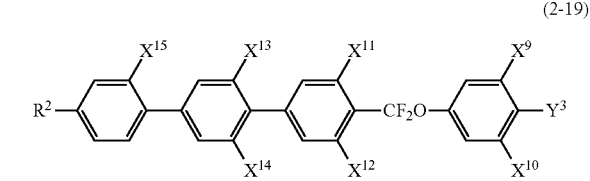

(2-20)
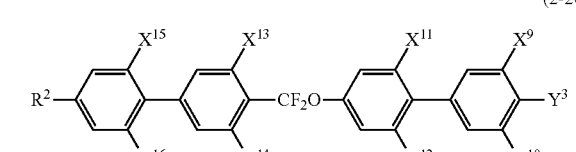

wherein, $R^2$ is alkyl having 1 to 12 carbons, alkoxy having 1 to 12 carbons, or alkenyl having 2 to 12 carbons; $X^9$, $X^{10}$, $X^{11}$, $X^{12}$, $X^{13}$, $X^{14}$, $X^{15}$ and $X^{16}$ are independently hydrogen or fluorine; and $Y^3$ is fluorine, chlorine, trifluoromethyl, or trifluoromethoxy.

Item 8 is the liquid crystal composition of item 1 or 2 in which the second component is at least one compound selected from the group of compounds represented by formula (2-18) of item 7.

Item 9 is the liquid crystal composition of item 1 or 2 in which the second component is at least one compound selected from the group of compounds represented by formula (2-19) of item 7.

Item 10 is the liquid crystal composition of any one of items 2 to 9 in which the proportion of the first component is in the range of 25 wt % to 80 wt %, and the proportion of the second component is in the range of 20 wt % to 75 wt %, based on the total weight of the liquid crystal composition.

Item 11 is the liquid crystal composition of any one of items 2 to 9 in which the proportion of the first component is in the range of 30 wt % to 75 wt %, and the proportion of the second component is in the range of 25 wt % to 70 wt %, based on the total weight of the liquid crystal composition.

Item 12 is the liquid crystal composition of any one of items 1 to 11 which further contains at least one compound selected from the group of compounds represented by formula (3) as a third component:

(3)
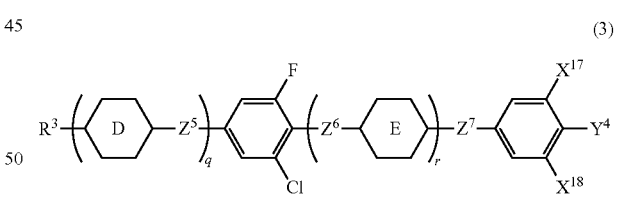

wherein $R^3$ is alkyl having 1 to 12 carbons, alkoxy having 1 to 12 carbons, or alkenyl having 2 to 12 carbons; ring D and ring E are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 2,6,7-trioxabicyclo[2.2.2]octane-1,4-diyl or tetrahydropyran-2,5-diyl; $X^{17}$ and $X^{18}$ are independently hydrogen or fluorine; $Y^4$ is fluorine, chlorine, trifluoromethyl or trifluoromethoxy; $Z^5$, $Z^6$ and $Z^7$ are independently a single bond, ethylene, carbonyloxy or difluoromethyleneoxy; and q and r are 0, 1, 2 or 3, and the sum of q and r is 1, 2 or 3.

Item 13 is the liquid crystal composition of item 12 in which the third component is at least one compound selected from the group of compounds represented by formula (3-1) to formula (3-3):

wherein $R^3$ is alkyl having 1 to 12 carbons, alkoxy having 1 to 12 carbons, or alkenyl having 2 to 12 carbons; $X^{19}$, $X^{20}$, $X^{21}$, $X^{22}$, $X^{23}$, $X^{24}$ and $X^{25}$ are independently hydrogen or fluorine; and $Y^4$ is fluorine, chlorine, trifluoromethyl or trifluoromethoxy.

Item 14 is the liquid crystal composition of item 12 in which the third component is at least one compound selected from the group of compounds represented by formula (3-1) of item 13.

Item 15 is the liquid crystal composition of item 12 in which the third component is at least one compound selected from the group of compounds represented by formula (3-2) of item 13.

Item 16 is the liquid crystal composition of any one of items 12 to 15 in which the proportion of the third component is in the range of 10 wt % to 50 wt % based on the total weight of the liquid crystal composition.

Item 17 is the liquid crystal composition of any one of items 1 to 16 which further contains at least one compound selected from the group of compounds represented by formula (4) as a $4^{th}$ component:

wherein $R^4$ and $R^5$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring F, ring G and ring I are independently 1,4-cyclohexylene, 1,4-phenylene, 2-fluoro-1,4-phenylene or 3-fluoro-1,4-phenylene; $Z^8$ and $Z^9$ are independently a single bond, ethylene, methyleneoxy or carbonyloxy; and s is 0, 1 or 2.

Item 18 is the liquid crystal composition of item 17 in which the fourth component is at least one compound selected from the group of compounds represented by formula (4-1) to formula (4-13):

(4-11)

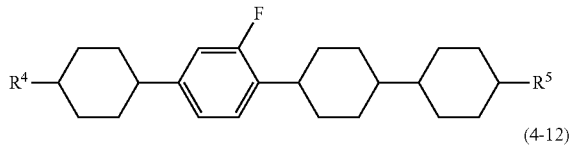

(4-12)

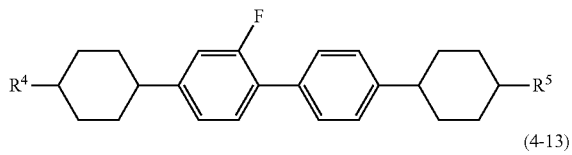

(4-13)

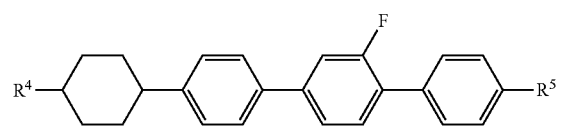

wherein $R^4$ and $R^5$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 19 is the liquid crystal composition of item 17 in which the fourth component is at least one compound selected from the group of compounds represented by formula (4-1) of item 18.

Item 20 is the liquid crystal composition of item 17 in which the fourth component is at least one compound selected from the group of compounds represented by formula (4-7) of item 18.

Item 21 is the liquid crystal composition of any one of items 17 to 20 in which the proportion of the fourth component is in the range of 3 wt % to 35 wt % based on the total weight of the liquid crystal composition.

Item 22 is the liquid crystal composition of any one of items 1 to 21 of which the maximum temperatures of nematic phase is 70° C. or higher, the optical anisotropy (25° C.) at the wavelength of 589 nanometers is 0.08 or more, and the dielectric anisotropy (25° C.) at a frequency of 1 kHz is 2 or more.

Item 23 is a liquid crystal display device including the liquid crystal composition of any one of items 1 to 22.

Item 24 is the liquid crystal display device of item 23 of which the operating mode is a TN mode, an OCB mode, an IPS mode, an FFS mode, a PSA mode or an FPA mode, and the driving mode is an active matrix mode.

Item 25 is use of the liquid crystal composition of any one of items 1 to 22 in a liquid crystal display device.

The invention also includes the following items: 1) the composition which further contains an optically active compound, 2) the composition which further contains an additive such as an antioxidant, a UV light absorbent, an antifoaming agent, a polymerizable compound or a polymerization initiator, 3) an AM device including the composition, 4) a device including the composition and having a TN, ECB, OCB, IPS, FFS, PSA or FPA mode, 5) a transmissive device including the composition, 6) use of the composition as a composition having a nematic phase, and 7) use of the composition as an optically active composition by adding an optically active compound to the composition.

The composition of the invention is explained in the following order. First, the constitution of the component compounds in the composition is explained. Second, the main characteristics of the component compounds and the main effects of the compounds on the composition are explained. Third, the combination of components in the composition, preferred proportions of the component compounds and the bases thereof are explained. Fourth, preferred embodiments of the component compounds are explained. Fifth, specific examples of the component compounds are shown. Sixth, additives that may be mixed with the composition are explained. Seventh, methods for synthesizing the component compounds are explained. Last, the application of the composition is explained.

First, the constitution of the component compounds in the composition is explained. The composition of the invention is classified into composition A and composition B. Composition A may further contain any other liquid crystal compound, an additive, an impurity or the like in addition to the liquid crystal compound selected from compounds (1), (2), (3) and (4). "Any other liquid crystal compound" means a liquid crystal compound different from compounds (1), (2), (3) and (4). Such a compound is mixed with the composition for the purpose of further adjusting the characteristics. The additives include an optically active compound, an antioxidant, an UV light absorbent, a dye, an antifoaming agent, a polymerizable compound and a polymerization initiator, etc. The impurity includes a compound mixed in a process such as preparation of the component compounds. Even in a case where the compound is liquid crystalline, the compound is classified as the impurity herein.

Composition B consists essentially of compounds selected from the group of compounds (1), (2), (3) and (4). The term "essentially" means that the composition may contain an additive and an impurity, but does not contain any liquid crystal compound different from the above compounds. Composition B has a smaller number of components than composition A has. Composition B is preferred to composition A in view of cost reduction. Composition A is preferred to composition B in view of possibility of further adjusting physical properties by mixing any other liquid crystal compound.

Second, the main characteristics of the component compounds and the main effects of the compounds on the characteristics of the composition are explained. The main characteristics of the component compounds are summarized in Table 2 on the basis of advantageous effects of the invention. In Table 2, the symbol L stands for "large" or "high," the symbol M stands for "medium," and the symbol S stands for "small" or "low." The symbols L, M and S represent a classification based on a qualitative comparison among the component compounds, and 0 (zero) means "a value of nearly zero."

TABLE 2

Characteristics of Compounds

| | Compounds | | | |
|---|---|---|---|---|
| | (1) | (2) | (3) | (4) |
| Maximum temperature | L | M to L | M to L | S to L |
| Viscosity | M to L | S to L | M to L | S to M |
| Optical anisotropy | M to L | M to L | M to L | S to L |
| Dielectric anisotropy | L | M to L | L | 0 |
| Specific resistance | L | L | L | L |

Upon mixing the component compounds with the composition, the main effects of the component compounds on the characteristics of the composition are as described below. Compound (1) increases the maximum temperature, decreases the minimum temperature and increases the dielectric anisotropy. Compound (2) decreases the minimum temperature, decreases the viscosity and increases the dielectric anisotropy. Compound (3) decreases the minimum temperature and increases the dielectric anisotropy. Compound (4) increases the maximum temperature and decreases the viscosity.

Third, the combination of components in the composition, preferred proportions of the component compounds and the bases thereof are explained. The combination of components in the composition includes a combination of the first component and the second component, a combination of the first component, the second component and the third component, a combination of the first component, the second component and the fourth component, and a combination of the first component, the second component, the third component and the fourth component.

The preferred combinations of components in the composition for increasing the dielectric anisotropy include the combination of the first component and the second component, and the combination of the first component, the second component and the third component. The preferred combinations for decreasing the viscosity include the combination of the first component, the second component and the fourth component, and the combination of the first component, the second component, the third component and the fourth component.

A preferred proportion of the first component is about 25 wt % or more for increasing the dielectric anisotropy, and about 85 wt % or less for decreasing the minimum temperature. A further preferred proportion is in a range of about 30 wt % to about 75 wt %. A particularly preferred proportion is in a range of about 40 wt % to about 70 wt %.

A preferred proportion of the second component is about 20 wt % or more for increasing the dielectric anisotropy, and about 75 wt % or less for decreasing the minimum temperature. A more preferred proportion is in a range of about 25 wt % to about 70 wt %. A particularly preferred proportion is in a range of about 40 wt % to about 60 wt %.

A preferred proportion of the third component is about 10 wt % or more for increasing the dielectric anisotropy, and about 50 wt % or less for decreasing the minimum temperature. A further preferred proportion is in a range of about 15 wt % to about 45 wt %. A particularly preferred proportion is in a range of about 20 wt % to about 40 wt %.

A preferred proportion of the fourth component is about 3 wt % or more for decreasing the viscosity, and about 35 wt % or less for increasing the dielectric anisotropy. A more preferred proportion is in the range of about 5 wt % to about 30 wt %. A particularly preferred proportion is in the range of about 8 wt % to about 25 wt %.

Fourth, preferred embodiments of the component compounds are explained.

$R^1$, $R^2$ and $R^3$ are independently alkyl having 1 to 12 carbons, alkoxy having 1 to 12 carbons, or alkenyl having 2 to 12 carbons. Preferred $R^1$, $R^2$ or $R^3$ is alkyl having 1 to 12 carbons for increasing the stability to ultraviolet light or heat. Preferred $R^2$ is branched alkyl having 1 to 12 carbons for decreasing the minimum temperature.

$R^4$ and $R^5$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine. Preferred $R^4$ or $R^5$ is alkenyl having 2 to 12 carbons for decreasing the viscosity, or alkyl having 1 to 12 carbons for increasing the stability to ultraviolet light, or increasing the stability to heat.

Preferred alkyl is methyl, ethyl, propyl, butyl, pentyl, hexyl, heptyl or octyl. Further preferred alkyl is ethyl, propyl, butyl, pentyl or heptyl for decreasing the viscosity, or 2-methylpropyl, 2-methylbutyl, 2-methylpentyl, 2-methylhexyl or 2-ethylhexyl for decreasing the minimum temperature.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. The preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. C is preferred in the alkenyl such as 2-butenyl, 2-pentenyl and 2-hexenyl. Among the alkenyl groups, straight alkenyl is preferred to branched alkenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Alkyl does not include cyclic alkyl. Alkoxy does not include cyclic alkoxy. Alkenyl does not include cyclic alkenyl. With regard to the configuration of 1,4-cyclohexylene, trans is preferred to cis for increasing the maximum temperature.

Ring A, ring B, ring C, ring D and ring E are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 2,6,7-trioxabicyclo[2.2.2]octane-1,4-diyl or tetrahydropyran-2,5-diyl. Arbitrary two rings A when m is 2 or 3 may be identical or different. Arbitrary two rings B when n is 2 or 3 may be identical or different. Arbitrary two rings C when p is 2, 3, or 4 may be identical or different. Arbitrary two rings D when q is 2 or 3 may be identical or different. Arbitrary two rings E when r is 2 or 3 may be identical or different. Preferred ring A, ring B, ring C, ring D or ring E is 1,4-cyclohexylene for increasing the maximum temperature, 1,4-phenylene for increasing the optical anisotropy, or 3,5-difluoro-1,4-phenylene for increasing the dielectric anisotropy. Preferred ring A or ring D is 1,4-phenylene or 3-fluoro-1,4-phenylene for decreasing the minimum temperature.

Ring F, ring G and ring I are independently 1,4-cyclohexylene, 1,4-phenylene, 2-fluoro-1,4-phenylene or 3-fluoro-1,4-phenylene. Preferred ring F, ring G or ring I is 1,4-cyclohexylene for decreasing the viscosity, 1,4-phenylene for decreasing the minimum temperature, or 3-fluoro-1,4-phenylene for increasing the dielectric anisotropy.

$Z^1$, $Z^2$, $Z^3$ and $Z^4$ are independently a single bond, ethylene, carbonyloxy or difluoromethyleneoxy. Arbitrary two $Z^1$ when m is 2 or 3 may be identical or different. Arbitrary two $Z^2$ when n is 2 or 3 may be identical or different. Arbitrary two $Z^4$ when p is 2, 3, or 4 may be identical or different. Preferred $Z^1$, $Z^2$, $Z^3$ or $Z^4$ is a single bond for decreasing the viscosity, ethylene for decreasing the minimum temperature, or difluoromethyleneoxy for increasing the dielectric anisotropy.

$Z^5$, $Z^6$ and $Z^7$ are independently a single bond, ethylene, carbonyloxy or difluoromethyleneoxy. Arbitrary two $Z^5$ when q is 2 or 3 may be identical or different. Arbitrary two $Z^6$ when r is 2 or 3 may be identical or different. Preferred $Z^5$, $Z^6$ or $Z^7$ is a single bond for decreasing the viscosity, or difluoromethyleneoxy for increasing the dielectric anisotropy.

$Z^8$ or $Z^9$ is independently a single bond, ethylene, methyleneoxy or carbonyloxy. Two $Z^8$ when s is 2 may be identical or different. Preferred $Z^8$ or $Z^9$ is carbonyloxy for increasing the maximum temperature, or a single bond for decreasing the viscosity.

$X^1$ to $X^{25}$ are independently hydrogen or fluorine. Preferred $X^1$ to $X^{25}$ are fluorine for increasing the dielectric anisotropy, or hydrogen for decreasing the viscosity or for increasing the maximum temperature.

$Y^1$, $Y^2$, $Y^3$ and $Y^4$ are independently fluorine, chlorine, trifluoromethyl or trifluoromethoxy. Preferred $Y^1$, $Y^2$, $Y^3$ or $Y^4$ is fluorine for decreasing the viscosity, or chlorine or trifluoromethoxy for decreasing the minimum temperature.

Then, m and n are 0, 1, 2 or 3, and a sum of m and n is 2 or 3. Preferred m is 0 for decreasing the viscosity, or 1 for decreasing the minimum temperature. Preferred n is 0 for decreasing the viscosity, or 2 or 3 for increasing the maximum temperature.

Then, p is 1, 2, 3 or 4. Preferred p is 1 for decreasing the viscosity, 2 for decreasing the minimum temperature, or 3 for increasing the maximum temperature.

Further, q and r are 0, 1, 2 or 3, and the sum of q and r is 1, 2 or 3. Preferred q is 0 for decreasing the viscosity, or 1 for decreasing the minimum temperature. Preferred r is 0 for decreasing the viscosity, or 1 or 2 for increasing the maximum temperature.

Furthermore, s is 0, 1 or 2. Preferred s is 0 for decreasing the viscosity, or 1 or 2 for increasing the maximum temperature.

Fifth, specific examples of the component compounds are shown. In the preferred compounds described below, $R^6$ is straight alkyl with 1 to 12 carbons, $R^7$ is straight or branched alkyl with 1 to 12 carbons, and $R^8$ and $R^9$ are independently straight alkyl with 1 to 12 carbons or straight alkenyl with 2 to 12 carbons.

Preferred compounds (1) include compounds (1-1-1) to (1-5-1). Further preferred compounds (1) include compounds (1-1-1) to (1-3-1). Preferred compounds (2) include compounds (2-1-1) to (2-20-1). Further preferred compounds (2) include compounds (2-12-1) to (2-15-1) and (2-17-1) to (2-20-1). Particularly preferred compounds (2) include compounds (2-12-1), (2-15-1), (2-18-1) and (2-19-1). Preferred compounds (3) include compounds (3-1-1) to (3-3-2). Further preferred compounds (3) include compound (3-1-1). Preferred compounds (4) include compounds (4-1-1) to (4-13-1). Further preferred compounds (4) include compounds (4-1-1), (4-3-1) and (4-7-1) to (4-13-1). Particularly preferred compounds (4) include compounds (4-1-1), (4-3-1), (4-7-1), (4-8-1) and (4-13-1).

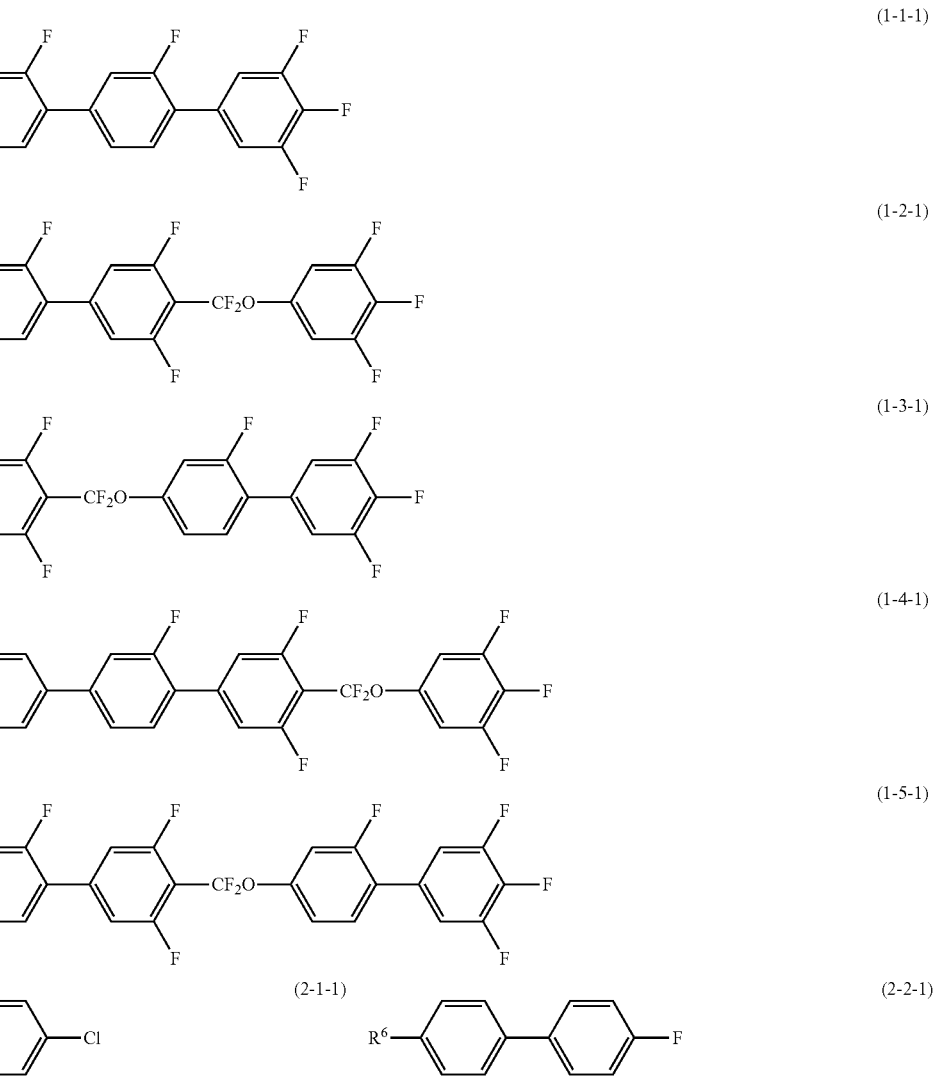

-continued
(2-3-1)
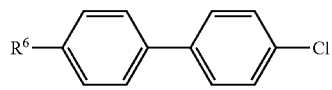
(2-4-1)
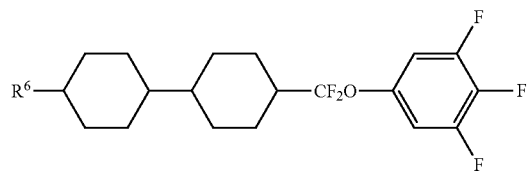
(2-5-1)
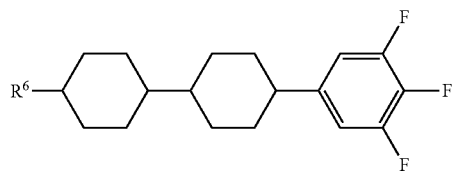
(2-6-1)
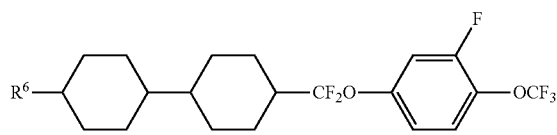
(2-7-1)
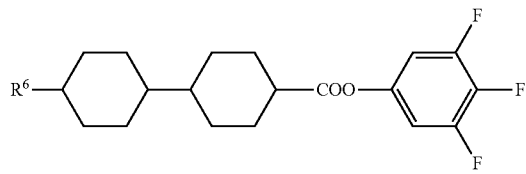
(2-8-1)
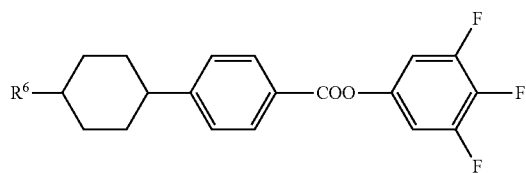
(2-9-1)
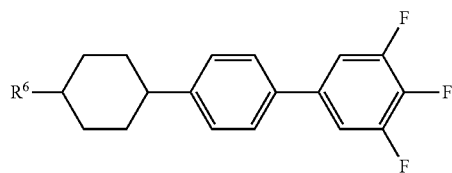
(2-10-1)
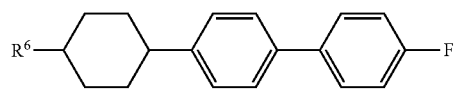
(2-11-1)
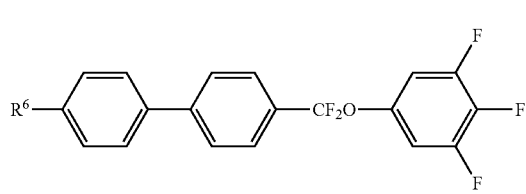
(2-12-1)
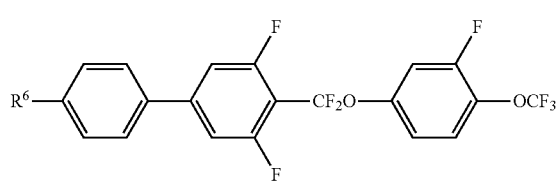
(2-13-1)
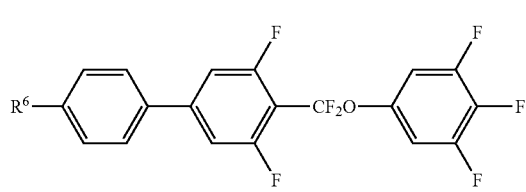
(2-14-1)
(2-15-1)

-continued
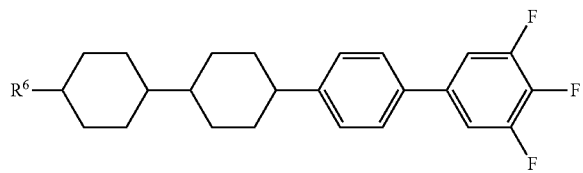
(2-16-1)
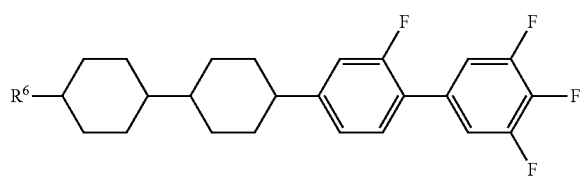
(2-17-1)
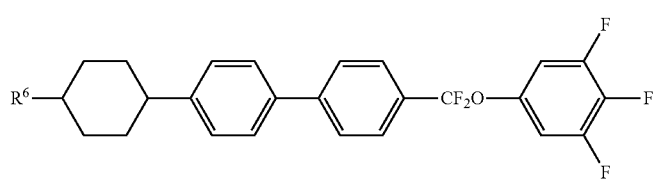
(2-18-1)
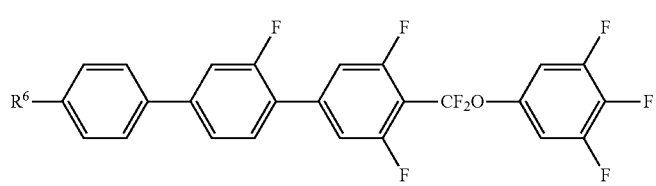
(2-19-1)
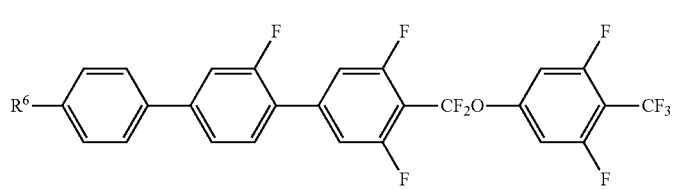
(2-19-2)
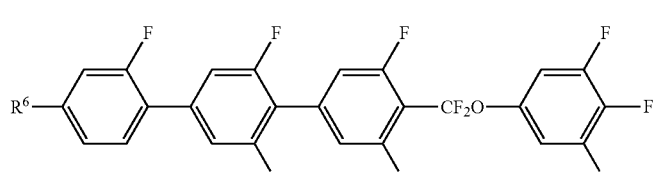
(2-19-3)
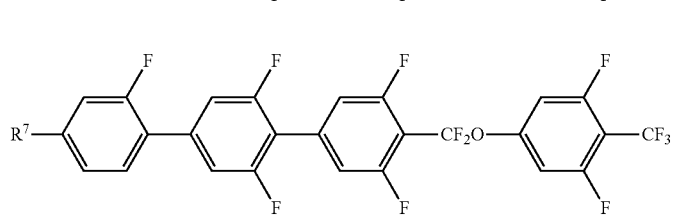
(2-19-4)
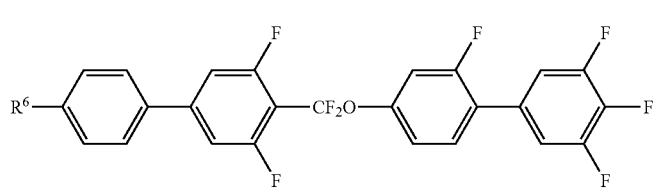
(2-20-1)
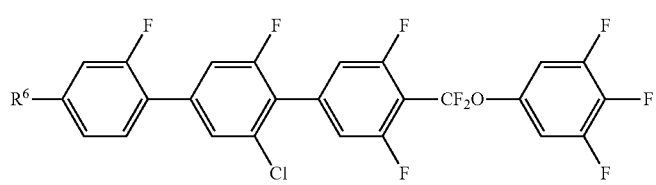
(3-1-1)

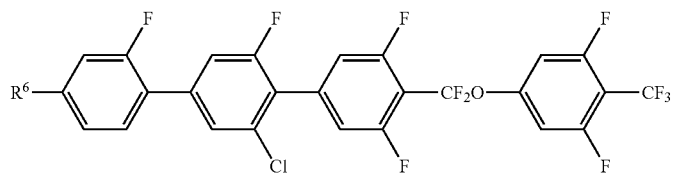
(3-1-2)
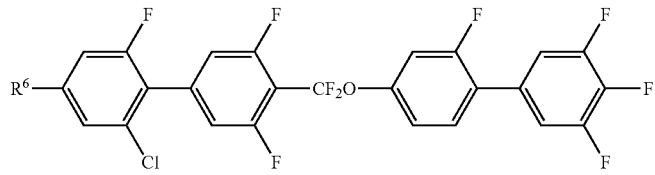
(3-2-1)
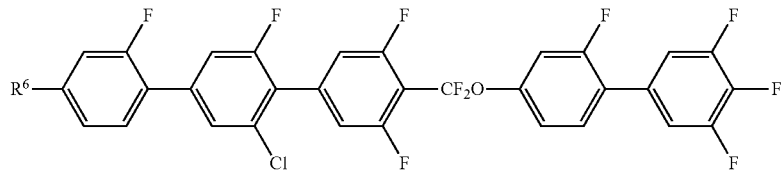
(3-3-1)
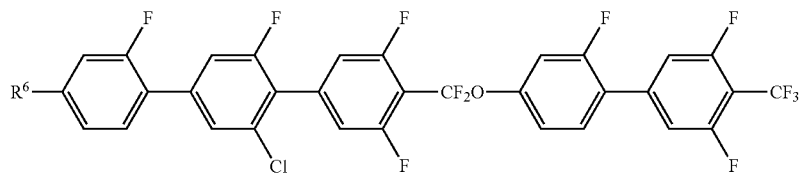
(3-3-2)
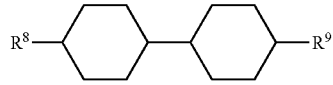
(4-1-1)
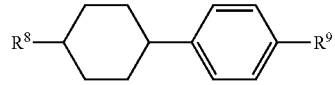
(4-2-1)
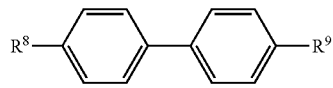
(4-3-1)
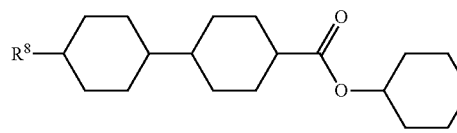
(4-4-1)
(4-5-1)
(4-6-1)
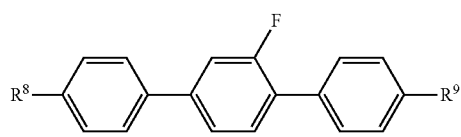
(4-7-1)
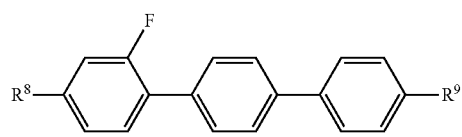
(4-8-1)
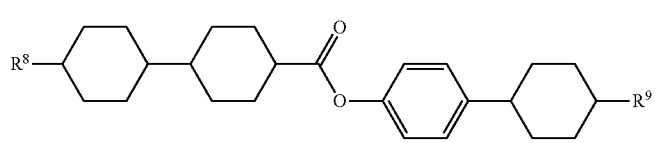
(4-9-1)
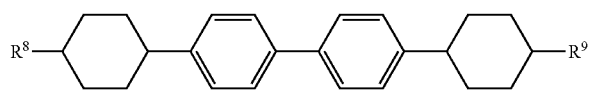
(4-10-1)
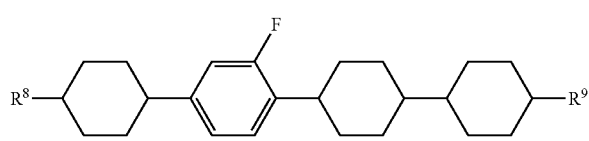
(4-11-1)

(4-12-1)

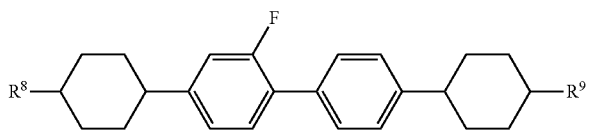

(4-13-1)

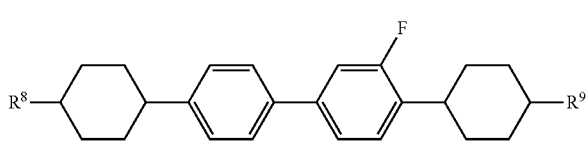

Sixth, the additives that may be mixed in the composition are explained. Such additives include an optically active compound, an antioxidant, a UV light absorbent, a dye, an antifoaming agent, a polymerizable compound and a polymerization initiator, etc. The optically active compound is mixed with the composition for the purpose of inducing a helical structure to give a twist angle in the liquid crystals. Examples of such a compound include compounds (5-1) to (5-5). A preferred proportion of the optically active compound is about 5 wt % or less. A further preferred proportion is in the range of about 0.01 wt % to about 2 wt %.

(5-1)

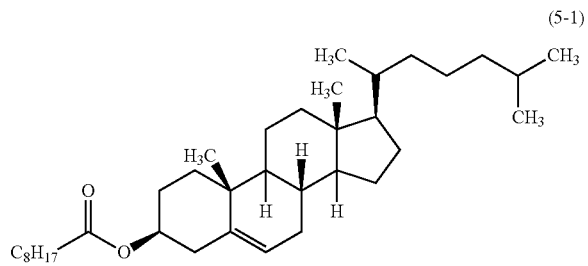

(5-2)

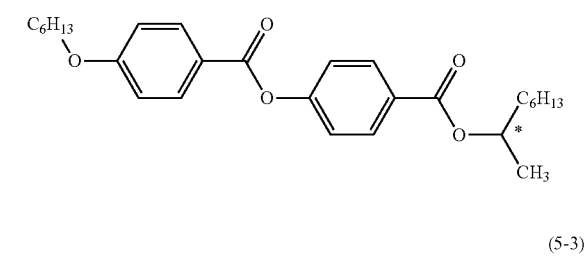

(5-3)

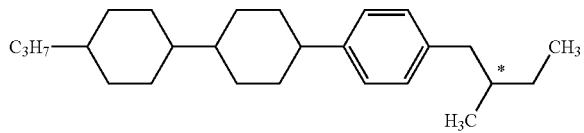

(5-4)

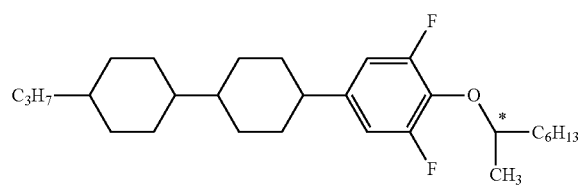

(5-5)

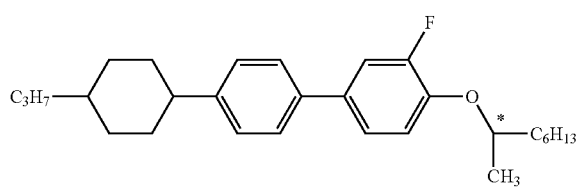

The antioxidant is mixed in the composition in order to prevent a decrease in the specific resistance caused by heating in air, or to maintain a large voltage holding ratio at room temperature and also at a temperature close to the maximum temperature of the nematic phase even after the device has been used for a long period of time.

(6)

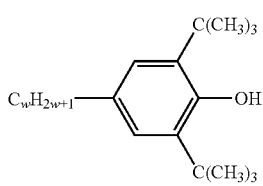

Preferred examples of the antioxidant include compound (6) where w is an integer of 1 to 9. For compound (6), preferred w is 1, 3, 5, 7 or 9, and further preferred w is 1 or 7. Compound (6) of w=1 is effective in preventing a decrease in the specific resistance caused by heating in air, for such compound (6) has a large volatility. Compound (6) of w=7 is effective in maintaining a large voltage holding ratio at room temperature and also at a temperature close to the maximum temperature of the nematic phase even after the device has been used for a long period of time, for such compound (6) has a small volatility. A preferred proportion of the antioxidant is about 50 ppm or more for achieving the effect thereof, and about 600 ppm or less for avoiding a decrease in the maximum temperature or avoiding an increase in the minimum temperature. A further preferred proportion is in the range of about 100 ppm to about 300 ppm.

Preferred examples of the UV light absorbent include a benzophenone derivative, a benzoate derivative and a triazole derivative. A light stabilizer such as an amine having steric hindrance is also preferred. A preferred proportion of the UV light absorbent or the stabilizer is about 50 ppm or more for achieving the effect thereof, and about 10,000 ppm or less for avoiding a decrease in the maximum temperature or avoiding an increase in the minimum temperature. A further preferred proportion is in the range of about 100 ppm to about 10,000 ppm.

A dichroic dye such as an azo dye or an anthraquinone dye is mixed in the composition to adapt the same to a device having a guest host (GH) mode. A preferred proportion of the dye is in a range of about 0.01 wt % to about 10 wt %. The antifoaming agent such as dimethyl silicone oil or methyl phenyl silicone oil is mixed in the composition for preventing foam formation. A preferred proportion of the antifoaming agent is about 1 ppm or more for achieving its effect, and about 1,000 ppm or less for avoiding a poor display. A further preferred proportion is in the range of about 1 ppm to about 500 ppm.

The polymerizable compound is mixed in the composition to adapt the same to a device having a polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative and a methacrylate derivative. A preferred proportion of the polymerizable compound is about 0.05 wt % or more for achieving the effect thereof, and about 10 wt % or less for avoiding a poor display. A further preferred proportion is in the range of about 0.1 wt % to about 2 wt %. The polymerizable compound is preferably polymerized by irradiation with ultraviolet light or the like in the presence of a suitable initiator such as a photo-polymerization initiator. Suitable conditions for polymerization, suitable types of the initiator and suitable amounts thereof are known to those skilled in the art and are described in literatures. For example, Irgacure 651 (registered trade name), Irgacure 184 (registered trade name) or Darocure 1173 (registered trade name) (BASF), each being the photo-polymerization initiator, is suitable for radical polymerization. A preferred proportion of the photo-polymerization initiator is in the range of about 0.1 wt % to about 5 wt % based on the polymerizable compound, and a particularly preferred proportion is in the range of about 1 wt % to about 3 wt %.

Seventh, methods for synthesizing the component compounds are explained. The compounds can be prepared with known methods. Examples of the synthetic methods are described below. Compound (1-2-1) is prepared by the method described in JP 2011-153202 A. Compounds (2-15-1) and (2-19-1) are prepared by the method described in JP H10-251186 A. Compound (3-1-1) is prepared by the method described in WO 2010/134430 A. Compound (4-1-1) is prepared by the method described in JP S59-70624 A and JP S59-176221 A. Compound (4-7-1) is prepared by the method described in JP 2006-503130 A. A compound represented by formula (6) of w=1 is available from Sigma-Aldrich Corporation. Compound (6) of w=7 and so forth are prepared according to the method described in U.S. Pat. No. 3,660,505 B.

Any compounds whose synthetic methods are not described above can be prepared with the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared with well-known methods using thus obtained compounds. For example, the component compounds are mixed and dissolved in each other by heating.

Last, the application of the composition is explained. The composition of the invention mainly has a minimum temperature of about 0° C. or lower, a maximum temperature of about 70° C. or higher, and an optical anisotropy in the range of about 0.07 to about 0.20. The device including the composition has a large voltage holding ratio. The composition is suitable for use in an AM device, particularly a transmissive AM device. A composition having an optical anisotropy in the range of about 0.08 to about 0.25, and also a composition having an optical anisotropy in the range of about 0.10 to about 0.30 may be prepared by controlling the proportions of the component compounds or by mixing any other liquid crystal compound. The composition can be used as a composition having a nematic phase and as an optically active composition by adding an optically active compound.

The composition can be used for an AM device. The composition can also be used for a PM device. The composition can also be used for an AM device and a PM device having a mode such as PC, TN, STN, ECB, OCB, IPS, FFS, VA, PSA or FPA. Use for an AM device having the TN, OCB, IPS or FFS mode is particularly preferred. In an AM device having the IPS mode or FFS mode, alignment of liquid crystal molecules in a state in which no voltage is applied may be parallel or perpendicular to a panel substrate. The devices may be of a reflective type, a transmissive type or a transflective type. Use for the transmissive device is preferred. The composition can also be used for an amorphous silicon-TFT device or a polysilicon-TFT device. The composition can also be used for a nematic curvilinear aligned phase (NCAP) device prepared by microencapsulating the composition, and also for a polymer dispersed (PD) device in which a three-dimensional network-polymer is formed in the composition.

EXAMPLES

For evaluating characteristics of a composition and a compound to be contained in the composition, the composition or the compound was made a measurement object. When the measurement object was a composition, it was measured as a sample as was, and the values obtained were described. When the measurement object was a compound, a sample for measurement was prepared by mixing the compound (15 wt %) with a base liquid crystal (85 wt %). The values of characteristics of the compound were calculated using the measured values, with an extrapolation method: (extrapolated value)={ (measured value of the sample for measurement)−0.85× (measured value of the base liquid crystal)}/0.15. When a smectic phase (or crystals) precipitated at the above ratio at 25° C., a ratio of the compound to the base liquid crystal was changed step by step in the order of (10 wt %:90 wt %), (5 wt %:95 wt %) and (1 wt %:99 wt %). The values of maximum temperature, optical anisotropy, viscosity and dielectric anisotropy with regard to the compound were determined with the extrapolation method.

Components of the base liquid crystal were described below. The proportion of each component is expressed in terms of wt %.

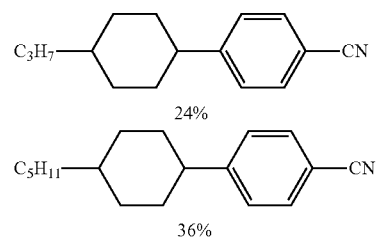

-continued

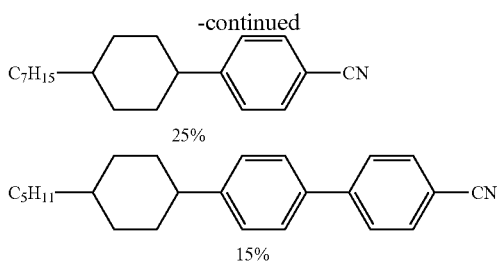

25%

15%

The characteristics were measured with the methods described below. Most of the methods are applied as described in Standard of Japan Electronics and Information Technology Industries Association (hereafter, abbreviated to "JEITA"), i.e., JEITA ED-2521B, that was discussed and established by JEITA, or as modified thereon.

Maximum Temperature of Nematic Phase (NI; ° C.):

A sample was placed on a hot plate in a melting point apparatus equipped with a polarizing microscope and was heated at a rate of 1° C./min. The temperature when a part of the sample began to change from a nematic phase to an isotropic liquid was measured. The maximum temperature of nematic phase are sometimes abbreviated as "maximum temperature."

Minimum Temperature of Nematic Phase ($T_c$; ° C.):

Samples each having a nematic phase were put in glass vials and kept in freezers at temperatures of 0° C., −10° C., −20° C., −30° C. and −40° C. for 10 days, and then liquid crystal phases were observed. For example, when a sample maintained the nematic phase at −20° C. and changed to crystals or a smectic phase at −30° C., $T_c$ was expressed as $T_c < -20°$ C. The minimum temperature of nematic phase may be occasionally abbreviated as "minimum temperature."

Viscosity (Bulk Viscosity; η; Measured at 20° C.; mPa·s):

A cone-plate (E type) rotational viscometer was used for measurement.

Viscosity (Rotational Viscosity; γ1; Measured at 25° C.; mPa·s):

The rotational viscosity was measured by the method described in M. Imai, et al., Molecular Crystals and Liquid Crystals, Vol. 259, p. 37 (1995). A sample was put in a TN device in which the twist angle was 0° and the distance (cell gap) between two glass substrates was 5 μm. A voltage was applied stepwise to the device in the range of 16 V to 19.5 V at an increment of 0.5 V. After a period of 0.2 second with no voltage, voltage was applied repeatedly under the conditions of only one of rectangular waves (rectangular pulse; 0.2 second) and no voltage (2 seconds). A peak current and a peak time of a transient current generated by the applied voltage were measured. The value of the rotational viscosity was obtained from the measured values and a calculation equation (8) described in page 40 of the paper of M. Imai et al. The value of dielectric anisotropy required for the calculation was obtained using the device by which the rotational viscosity was measured and by the method as described below.

Optical Anisotropy (Refractive Index Anisotropy; Δn; Measured at 25° C.):

The measurement was carried out by means of an Abbe refractometer with a polarizing plate mounted on an ocular, using light at a wavelength of 589 nm. The surface of a main prism was rubbed in one direction, and then a sample was added dropwise onto the main prism. The refractive index $n_\parallel$ was measured when the direction of polarized light was parallel to the direction of rubbing. The refractive index $n_\perp$ was measured when the direction of polarized light was perpendicular to the direction of rubbing. The value of the optical anisotropy was calculated by the equation "$\Delta n = n_\parallel - n_\perp$".

Dielectric Anisotropy (Δ∈; Measured at 25° C.):

A sample was put in a TN device in which the distance (cell gap) between two glass substrates was 9 μm and the twist angle was 80 degrees. Sine waves (10 V, 1 kHz) were applied to the device, and after 2 seconds, the dielectric constant $\in_\parallel$ in the major axis direction of liquid crystal molecules was measured. Sine waves (0.5 V, 1 kHz) were applied to the device, and after 2 seconds, the dielectric constant $\in_\perp$ in the minor axis direction of the liquid crystal molecules was measured. The value of Δ∈ was calculated by the equation "$\Delta\in = \in_\parallel - \in_\perp$".

Threshold Voltage (Vth; Measured at 25° C.; V):

An LCD-5100 luminance meter made by Otsuka Electronics Co., Ltd. was used for the measurement. The light source was a halogen lamp. A sample was put in a TN device having a normally white mode in which the distance (cell gap) between two glass substrates was 0.45/Δn (μm) and the twist angle was 80 degrees. The voltage (32 Hz, rectangular waves) to be applied to the device was increased stepwise from 0 V to 10 V at an increment of 0.02 V. On the occasion, the device was irradiated with light from a direction perpendicular to the device, and the amount of light transmitted through the device was measured. A voltage-transmittance curve was plotted, in which the maximum amount of light corresponds to 100% transmittance and the minimum amount of light corresponds to 0% transmittance. The threshold voltage was the voltage at 90% transmittance.

Voltage Holding Ratio (VHR-1; Measured at 25° C.; %):

A TN device used for the measurement had a polyimide alignment film, wherein the distance (cell gap) between two glass substrates was 5 μm. A sample was put in the device, and then the device was sealed with a UV-curable adhesive. A pulse voltage (60 microseconds at 5 V) was applied to the device and to charge the device. The decaying voltage was measured for 16.7 milliseconds with a high-speed voltmeter, and area A between the voltage curve and the horizontal axis in a unit cycle was determined. Area B is the area without decay. The voltage holding ratio is a percentage of area A to area B.

Voltage Holding Ratio (VHR-2; Measured at 80° C.; %):

A TN device used for the measurement had a polyimide alignment film, wherein the distance (cell gap) between two glass substrates was 5 μm. A sample was put in the device, and then the device was sealed with a UV-curable adhesive. A pulse voltage (60 microseconds at 5 V) was applied to the TN device to charge the device. The decaying voltage was measured for 16.7 milliseconds with a high-speed voltmeter, and area A between the voltage curve and the horizontal axis in a unit cycle was determined. Area B is the area without decay. The voltage holding ratio is a percentage of area A to area B.

Voltage Holding Ratio (VHR-3; Measured at 25° C.; %):

The stability to UV light was evaluated by measuring the voltage holding ratio after a device was irradiated with UV-light. A TN device used for measurement had a polyimide alignment film, wherein the cell gap was 5 μm. A sample was injected into the device, and then the device was irradiated with light for 20 min. The light source was an ultra-high-pressure mercury lamp USH-500D (made by Ushio, Inc.), and the distance between the device and the light source was 20 cm. In measuring VHR-3, the decaying voltage was measured for 16.7 milliseconds. A composition having a large VHR-3 has a large stability to UV light. The value of VHR-3 is preferably 90% or more, and further preferably 95% or more.

Voltage Holding Ratio (VHR-4; Measured at 25° C.; %):

A TN device into which a sample was injected was heated in a constant-temperature bath at 80° C. for 500 hours, and then the stability to heat was evaluated by measuring the voltage holding ratio. In measuring VHR-4, the decaying voltage was measured for 16.7 milliseconds. A composition having a large VHR-4 has a large stability to heat.

Response Time ($\tau$; Measured at 25° C.; Ms):

An LCD-5100 luminance meter made by Otsuka Electronics Co., Ltd. was used for measurement. The light source was a halogen lamp. The low-pass filter was set at 5 kHz. A sample was put in a TN device having a normally white mode in which the distance (cell gap) between two glass substrates was 5.0 µm and the twist angle was 80°. Rectangular waves (60 Hz, 5 V, 0.5 second) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. The rise time ($\tau r$) is the period of time needed for the change from 90% transmittance to 10% transmittance. The fall time ($\tau f$) is the period of time needed for the change from 10% transmittance to 90% transmittance. The response time means the sum of thus determined rise time and fall time.

Elastic Constant (K; Measured at 25° C.; pN):

HP4284A LCR Meter made by Yokogawa-Hewlett-Packard Co. was used for the measurement. A sample was put in a horizontal alignment cell in which the distance (cell gap) between two glass substrates was 20 µm. A voltage in the range of 0 V to 20 V was applied to the cell, and the electrostatic capacity and the applied voltage were measured. The measured values of the electrostatic capacity (C) and the applied voltage (V) were fitted to equation (2. 98) and equation (2. 101) in page 75 of "Liquid Crystal Device Handbook" (Ekisho Debaisu Handobukku in Japanese) (The Nikkan Kogyo Shimbun, Ltd.), and the values of K11 and K33 were obtained from equation (2. 99). Next, K22 was calculated using the previously determined values of K11 and K33 in equation (3. 18) in page 171 of the same Handbook. The elastic constant was the mean value of thus determined K11, K22 and K33.

Specific Resistance ($\rho$; Measured at 25° C.; $\Omega \cdot cm$):

Into a vessel equipped with electrodes, 1.0 milliliter of a sample was injected. A DC voltage (10 V) was applied to the vessel, and the DC current after 10 seconds was measured. The specific resistance was calculated from the following equation: (specific resistance)=(voltage)×(electric capacity of the vessel)}/{(direct current)×(dielectric constant of vacuum)}.

Helical Pitch (P; Measured at Room Temperature; µm):

The helical pitch was measured according to the wedge method (Handbook of Liquid Crystals (Ekisho Binran in Japanese), page 196, (issued in 2000, Maruzen Co., Ltd.)). A sample was injected into a wedge cell and allowed to stand at room temperature for 2 hours, and then the gap (d2−d1) between disclination lines was observed by means of a polarizing microscope (trade name: MM40/60 series, Nikon Corporation). The helical pitch (P) was calculated by the following equation in which the angle of the wedge cell was expressed as e:

$$P=2\times(d2-d1)\times\tan\theta.$$

$^1$H-NMR Analysis:

As the measuring apparatus, DRX-500 (made by Bruker BioSpin Corporation) was used. In the measurement, a sample prepared in Examples and so forth was dissolved in a deuterated solvent such as $CDCl_3$ in which the sample was soluble, and the measurement was carried out under the conditions of room temperature, 500 MHz and 16 times of accumulation. In the explanation of nuclear magnetic resonance spectra obtained, the symbols s, d, t, q and m stand for a singlet, a doublet, a triplet, a quartet and a multiplet, respectively. Moreover, as an internal standard of a zero point of chemical shift $\delta$ values, tetramethylsilane (TMS) was used.

Gas Chromatographic Analysis:

GC-14B Gas Chromatograph made by Shimadzu Corporation was used for the measurement. The carrier gas was helium (2 mL/min). The sample injector and the detector (FID) were set to 280° C. and 300° C., respectively. A capillary column DB-1 (length 30 m, bore 0.32 mm, film thickness 0.25 µm; dimethylpolysiloxane as a stationary phase, nonpolar) made by Agilent Technologies, Inc. was used for separation of component compounds. After the column was kept at 200° C. for 2 min, the column was heated to 280° C. at a rate of 5° C./min. A sample was prepared in an acetone solution (0.1 wt %), and then 1 µL of the solution was injected into the sample injector. The recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 µm) made by Agilent Technologies, Inc., Rtx-1 (length 30 m, bore 0.32 mm, film thickness 0.25 µm) made by Restek Corporation and BP-1 (length 30 m, bore 0.32 mm, film thickness 0.25 µm) made by SGE International Pty. Ltd. The capillary column CBP1-M50-025 (length 50 m, bore 0.25 mm, film thickness 0.25 µm) made by Shimadzu Corporation may also be used for the purpose of avoiding an overlap of peaks of the compounds.

The proportions of liquid crystal compounds contained in the composition may be calculated by the method as described below. The liquid crystal compounds can be detected by means of a gas chromatograph. A ratio of peak areas in the gas chromatogram corresponds to the proportion (in molar number) of the liquid crystal compounds. When the capillary columns described above were used, a correction coefficient of each of the liquid crystal compounds may be regarded as 1 (one). Accordingly, the proportion (wt %) of the liquid crystal compounds was calculated from the ratio of peak areas.

The invention will be explained in detail by way of Examples. The invention is not limited by the Examples described below. The compounds in Comparative Examples and Examples were expressed using symbols according to the definitions in Table 3 below. In Table 3, the configuration of 1,4-cyclohexylene is trans. A parenthesized number next to a symbolized compound in Comparative Examples and Examples corresponds to the number of the compound. The symbol (−) means any other liquid crystal compound. The proportions (percentage) of the liquid crystal compounds is presented in terms of weight percent (wt %) based on the total weight of the liquid crystal composition. The liquid crystal composition contains an impurity. The values of characteristics of the composition were summarized in the last part.

TABLE 3

Method for Description of Compounds using Symbols
R—(A₁)—Z₁—...—Zₙ—(Aₙ)—R'

1) Left-terminal Group R—

| R— | Symbol |
|---|---|
| $C_nH_{2n+1}$— | n- |
| $C_nH_{2n+1}O$— | nO— |
| $C_mH_{2m+1}OC_nH_{2n}$— | mOn— |
| $CH_2=CH$— | V— |
| $C_nH_{2n+1}$—CH=CH— | nV— |
| $CH_2=CH$—$C_nH_{2n}$— | Vn— |
| $C_mH_{2m+1}$—CH=CH—$C_nH_{2n}$— | mVn— |
| $CF_2=CH$— | VFF— |
| $C_{m-1}H_{2m-1}CH(C_nH_{2n+1})C_pH_{2p}$— | m(n)p- |

2) Right-terminal Group —R'

| —R' | Symbol |
|---|---|
| —$C_nH_{2n+1}$ | -n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —F | —F |
| —Cl | —CL |
| —$OCF_3$ | —OCF3 |
| —$CF_3$ | —CF3 |
| —CN | —C |
| —COO—$CH_3$ | —EMe |

3) Bonding Group —Zₙ—

| —Zₙ— | Symbol |
|---|---|
| —$C_2H_4$— | 2 |
| —COO— | E |
| —CH=CH— | V |
| —C≡C— | T |
| —$CF_2O$— | X |

4) Ring Structure —Aₙ—

| —Aₙ— | Symbol |
|---|---|
|  | H |
|  | B |
| 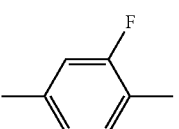 | B(F) |
| 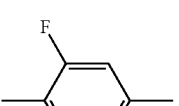 | B(2F) |
| 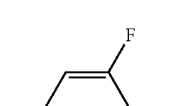 | B(F,F) |
| 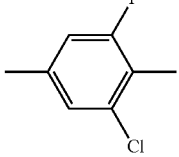 | B(F,CL) |
| 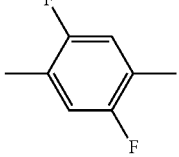 | B(2F,5F) |
| 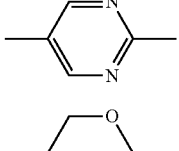 | Py |
| 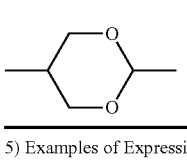 | dh |
| 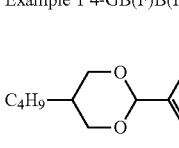 | G |

5) Examples of Expression

Example 1 4-GB(F)B(F,F)XB(F,F)—F

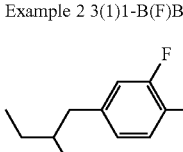

Example 2 3(1)1-B(F)B(F,F)B(F,F)XB(F,F)—CF3

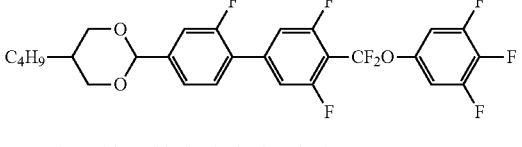

Example 3 3-HHB-1

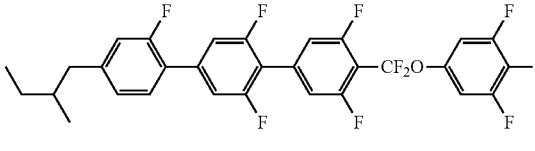

Example 4 3-BB(F)B(F,F)—F

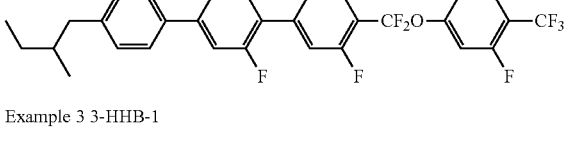

Comparative Example 1

Example 4 was selected from the compositions disclosed in JP 2001-003053 A. The selection was based on the reason that the composition contains a compound similar to compound (1) and compound (2) and has the largest dielectric anisotropy. The components and the characteristics of the composition are as described below.

| | | |
|---|---|---|
| 3-HGB(F,F)-F | (—) similar to (1) | 6% |
| 3-GHB(F,F)-F | (—) similar to (1) | 6% |
| 3-HHB(F,F)-F | (2-5-1) | 7% |
| 4-HHB(F,F)-F | (2-5-1) | 4% |
| 2-BB(F,F)XB(F,F)-F | (2-15-1) | 10% |
| 3-BB(F,F)XB(F,F)-F | (2-15-1) | 15% |
| 2-HBB(F,F)XB(F,F)-F | (2-18) | 10% |
| 3-HBB(F,F)XB(F,F)-F | (2-18) | 10% |
| 2-BB(F,F)XBB(F)-F | (2-20) | 9% |
| 3-BB(F,F)XBB(F)-F | (2-20) | 9% |
| 3-BB(F,F)XBB(F)-OCF3 | (2-20) | 7% |
| 3-H2HB(F,F)-F | (2) | 7% |

NI=76.1° C.; Tc<−20° C.; $\Delta n$=0.132; $\Delta\epsilon$=17.7; Vth=0.96 V.

Comparative Example 2

Example 4 was selected from the compositions disclosed in JP 2011-153202 A. The selection is based on the reason that the composition contains compound (1), compound (2) and compound (4), and has a high maximum temperature and the highest dielectric anisotropy. The components and the characteristics of the composition are as described below.

| | | |
|---|---|---|
| 3-GB(F)B(F,F)XB(F,F)-F | (1-2-1) | 5% |
| 4-GB(F)B(F,F)XB(F,F)-F | (1-2-1) | 3% |
| 5-GB(F)B(F,F)XB(F,F)-F | (1-2-1) | 2% |
| 2-HGB(F,F)XB(F,F)-F | (1) | 5% |
| 3-HGB(F,F)XB(F,F)-F | (1) | 3% |
| 4-HGB(F,F)XB(F,F)-F | (1) | 2% |
| 3-HHXB(F,F)-F | (2-6-1) | 3% |
| 3-HHEB(F,F)-F | (2-8-1) | 6% |
| 5-HHEB(F,F)-F | (2-8-1) | 4% |
| 2-BB(F,F)XB(F,F)-F | (2-15-1) | 2% |
| 3-BB(F,F)XB(F,F)-F | (2-15-1) | 6% |
| 2-HHBB(F,F)-F | (2-16-1) | 2% |
| 3-HHBB(F,F)-F | (2-16-1) | 4% |
| 4-HHBB(F,F)-F | (2-16-1) | 2% |
| 5-HHBB(F,F)-F | (2-16-1) | 2% |
| 3-BB(F)B(F,F)XB(F,F)-F | (2-19-1) | 3% |
| 4-BB(F)B(F,F)XB(F,F)-F | (2-19-1) | 6% |
| 3-HH-V | (4-1-1) | 16% |
| 3-GHB(F,F)-F | (—) similar to (1) | 4% |
| 4-GHB(F,F)-F | (—) similar to (1) | 8% |
| 5-GHB(F,F)-F | (—) similar to (1) | 12% |

NI=83.0° C.; Tc<−20° C.; $\Delta n$=0.101; $\Delta\epsilon$=21.1; $\gamma 1$=227 mPa·s.

Example 1

| | | |
|---|---|---|
| 4-GB(F)B(F,F)XB(F,F)-F | (1-2-1) | 10% |
| 4-GB(F,F)XB(F)B(F,F)-F | (1-3-1) | 20% |
| 3-HHXB(F,F)-F | (2-6-1) | 20% |
| 3-BB(F,F)XB(F,F)-F | (2-15-1) | 15% |
| 3-HBBXB(F,F)-F | (2-18-1) | 10% |
| 3-BB(F)B(F,F)XB(F,F)-F | (2-19-1) | 7% |
| 4-BB(F)B(F,F)XB(F,F)-F | (2-19-1) | 10% |
| 5-BB(F)B(F,F)XB(F,F)-F | (2-19-1) | 8% |

NI=88.1° C.; Tc<−20° C.; $\Delta n$=0.149; $\Delta\epsilon$=50.2; $\gamma 1$=524.3 mPa·s; VHR-1=97.8%; VHR-2=97.3%; VHR-3=95.6%.

Example 2

| | | |
|---|---|---|
| 3-GB(F)B(F)B(F,F)-F | (1-1-1) | 3% |
| 4-GB(F)B(F,F)XB(F,F)-F | (1-2-1) | 8% |
| 2-GB(F,F)XB(F)B(F,F)-F | (1-3-1) | 10% |
| 3-GB(F,F)XB(F)B(F,F)-F | (1-3-1) | 8% |
| 4-GB(F,F)XB(F)B(F,F)-F | (1-3-1) | 8% |
| 5-GBB(F)B(F,F)XB(F,F)-F | (1-4-1) | 3% |
| 6-GB(F)B(F,F)XB(F)B(F,F)-F | (1-5-1) | 5% |
| 5-HB-CL | (2-1-1) | 3% |
| 2-HHB-CL | (2-4-1) | 3% |
| 3-HHB(F,F)-F | (2-5-1) | 3% |
| 5-HHEB(F,F)-F | (2-8-1) | 2% |
| 2-HBEB(F,F)-F | (2-9-1) | 3% |
| 3-HBB(F,F)-F | (2-11-1) | 5% |
| 3-BB(F)B(F,F)-F | (2-12-1) | 10% |
| 2-BB(F,F)XB(F,F)-F | (2-15-1) | 5% |
| 2-HHBB(F,F)-F | (2-16-1) | 5% |
| 3-HBBXB(F,F)-F | (2-18-1) | 5% |
| 4-BB(F)B(F,F)XB(F,F)-F | (2-19-1) | 3% |
| 4-BB(F)B(F,F)XB(F,F)-CF3 | (2-19-2) | 5% |
| 5-B(F)B(F,F)B(F,F)XB(F,F)-CF3 | (2-19-4) | 3% |

NI=90.2° C.; Tc<−20° C.; $\Delta n$=0.156; $\Delta\epsilon$=52.1; $\gamma 1$=582.6 mPa·s; VHR-1=97.5%; VHR-2=97.1%; VHR-3=94.1%.

Example 3

| | | |
|---|---|---|
| 2-GB(F,F)XB(F)B(F,F)-F | (1-3-1) | 14% |
| 3-GB(F,F)XB(F)B(F,F)-F | (1-3-1) | 8% |
| 4-GB(F,F)XB(F)B(F,F)-F | (1-3-1) | 8% |
| 5-GB(F)B(F,F)XB(F)B(F,F)-F | (1-5-1) | 8% |
| 6-GB(F)B(F,F)XB(F)B(F,F)-F | (1-5-1) | 5% |
| 1V2-BB-F | (2-2) | 3% |
| 1V2-BB-CL | (2-3) | 3% |
| 1-HHXB(F,F)-F | (2-6-1) | 9% |
| 3-HHXB(F)-OCF3 | (2-7-1) | 3% |
| 5-HBB-F | (2-10-1) | 3% |
| 3-BBXB(F,F)-F | (2-13-1) | 5% |
| 3-BB(F,F)XB(F)-OCF3 | (2-14-1) | 4% |
| 3-HHB(F)B(F,F)-F | (2-17-1) | 4% |
| 5-HBBXB(F,F)-F | (2-18-1) | 5% |
| 4-BB(F)B(F,F)XB(F,F)-F | (2-19-1) | 5% |
| 5-BB(F)B(F,F)XB(F,F)-F | (2-19-1) | 3% |
| 5-BB(F,F)B(F,F)XB(F,F)-CF3 | (2-19-2) | 5% |
| 3-BB(F,F)XB(F)B(F,F)-F | (2-20-1) | 5% |

NI=89.2° C.; Tc<−20° C.; $\Delta n$=0.157; $\Delta\epsilon$=51.4; $\gamma 1$=552.5 mPa·s; VHR-1=98.1%; VHR-2=97.4%; VHR-3=96.1%.

Example 4

| | | |
|---|---|---|
| 5-GB(F)B(F)B(F,F)-F | (1-1-1) | 5% |
| 5-GB(F)B(F,F)XB(F,F)-F | (1-2-1) | 5% |
| 2-GB(F,F)XB(F)B(F,F)-F | (1-3-1) | 10% |
| 3-GB(F,F)XB(F)B(F,F)-F | (1-3-1) | 5% |
| 4-GB(F,F)XB(F)B(F,F)-F | (1-3-1) | 10% |
| 5-GB(F,F)XB(F)B(F,F)-F | (1-3-1) | 5% |
| 3-HHB-CL | (2-4-1) | 5% |
| 3-HHXB(F,F)-F | (2-6-1) | 7% |
| 5-HBB-F | (2-10-1) | 3% |
| 3-HBB(F,F)-F | (2-11-1) | 5% |
| 3-HHBB(F,F)-F | (2-16-1) | 4% |
| 4-HHBB(F,F)-F | (2-16-1) | 5% |
| 4-HBBXB(F,F)-F | (2-18-1) | 5% |
| 4-B(F)B(F,CL)B(F,F)XB(F,F)-F | (3-1-1) | 7% |
| 5-B(F)B(F,CL)B(F,F)XB(F,F)-F | (3-1-1) | 8% |

| | | |
|---|---|---|
| 6-B(F)B(F,CL)B(F,F)XB(F,F)-CF3 | (3-1-2) | 8% |
| 6-B(F,CL)B(F)B(F,F)XB(F)B(F,F)-F | (3-2-1) | 3% |

NI=88.3° C.; Tc<−20° C.; Δn=0.144; Δ∈=54.4; γ1=623.0 mPa·s; VHR-1=97.1%; VHR-2=97.2%.

Example 5

| | | |
|---|---|---|
| 3-GB(F)B(F,F)XB(F,F)-F | (1-2-1) | 7% |
| 4-GB(F)B(F,F)XB(F,F)-F | (1-2-1) | 8% |
| 5-GB(F)B(F,F)XB(F,F)-F | (1-2-1) | 5% |
| 4-GB(F,F)XB(F)B(F,F)-F | (1-3-1) | 12% |
| 5-HB-CL | (2-1-1) | 5% |
| 3-HHB-CL | (2-4-1) | 5% |
| 3-HHXB(F)-OCF3 | (2-7-1) | 5% |
| 3-HHB(F)B(F,F)-F | (2-17-1) | 7% |
| 3-HBB(F)B(F,F)XB(F,F)-F | (2-18) | 5% |
| 5-HBB(F)B(F,F)XB(F,F)-F | (2-18) | 5% |
| 3(1)1-B(F)B(F,F)B(F,F)XB(F,F)-CF3 | (2-19-4) | 3% |
| 4-B(F)B(F,CL)B(F,F)XB(F,F)-F | (3-1-1) | 8% |
| 5-B(F)B(F,CL)B(F,F)XB(F,F)-F | (3-1-1) | 5% |
| 6-B(F)B(F,CL)B(F,F)XB(F)B(F,F)-F | (3-3-1) | 5% |
| 8-B(F)B(F,CL)B(F,F)XB(F)B(F,F)-F | (3-3-1) | 8% |
| 7-B(F)B(F,CL)B(F,F)XB(F)B(F,F)-CF3 | (3-3-2) | 7% |

NI=90.5° C.; Δn=0.153; Δ∈=57.7; γ1=681.9 mPa·s; VHR-1=97.2%; VHR-2=97.4%.

Example 6

| | | |
|---|---|---|
| 4-GB(F)B(F)B(F,F)-F | (1-1-1) | 4% |
| 5-GB(F)B(F)B(F,F)-F | (1-1-1) | 3% |
| 3-GB(F)B(F,F)XB(F,F)-F | (1-2-1) | 8% |
| 4-GB(F)B(F,F)XB(F,F)-F | (1-2-1) | 8% |
| 5-GB(F)B(F,F)XB(F,F)-F | (1-2-1) | 7% |
| 3-GB(F,F)XB(F)B(F,F)-F | (1-3-1) | 9% |
| 4-GB(F,F)XB(F)B(F,F)-F | (1-3-1) | 15% |
| 3-HHBB(F,F)-F | (2-16-1) | 5% |
| 3-BB(F)B(F,F)XB(F,F)-F | (2-19-1) | 3% |
| 4-BB(F)B(F,F)XB(F,F)-F | (2-19-1) | 5% |
| 5-BB(F)B(F,F)XB(F,F)-F | (2-19-1) | 3% |
| 5-B(F)B(F,F)B(F,F)XB(F,F)-F | (2-19-3) | 5% |
| 2-HH-3 | (4-1-1) | 5% |
| 3-HH-4 | (4-1-1) | 3% |
| 3-HH-V | (4-1-1) | 5% |
| 3-HH-V1 | (4-1-1) | 3% |
| 5-HB-O2 | (4-2) | 3% |
| V2-BB-1 | (4-3-1) | 3% |
| 1-BB-3 | (4-3-1) | 3% |

NI=88.3° C.; Δn=0.142; Δ∈=49.1; γ1=499.1 mPa·s; VHR-1=98.1%; VHR-2=97.8%; VHR-3=96.1%.

Example 7

| | | |
|---|---|---|
| 4-GB(F)B(F,F)XB(F,F)-F | (1-2-1) | 8% |
| 2-GB(F,F)XB(F)B(F,F)-F | (1-3-1) | 5% |
| 3-GB(F,F)XB(F)B(F,F)-F | (1-3-1) | 8% |
| 4-GB(F,F)XB(F)B(F,F)-F | (1-3-1) | 15% |
| 5-GB(F,F)XB(F)B(F,F)-F | (1-3-1) | 10% |
| 2-BBXB(F,F)-F | (2-13-1) | 3% |
| 3-BBXB(F,F)-F | (2-13-1) | 5% |
| 1-BB(F,F)XB(F,F)-F | (2-15-1) | 5% |
| 3-BB(F,F)XB(F,F)-F | (2-15-1) | 5% |
| 3-HHBB(F,F)-F | (2-16-1) | 5% |
| 3-BB(F)B(F,F)XB(F,F)-F | (2-19-1) | 3% |
| 4-BB(F)B(F,F)XB(F,F)-F | (2-19-1) | 5% |
| 6-B(F)B(F,F)B(F,F)XB(F,F)-F | (2-19-3) | 3% |
| 3-HHB-3 | (4-5-1) | 5% |
| 4-HHEH-3 | (4-4-1) | 3% |
| 3-HBB-2 | (4-6-1) | 3% |
| 2-BB(F)B-3 | (4-7-1) | 5% |
| 3-B(F)BB-2 | (4-8-1) | 4% |

NI=89.5° C.; Δn=0.157; Δ∈=49.8; γ1=507.0 mPa·s; VHR-1=98.0%; VHR-2=97.5%; VHR-3=96.3%.

Example 8

| | | |
|---|---|---|
| 3-GB(F)B(F,F)XB(F,F)-F | (1-2-1) | 3% |
| 2-GB(F,F)XB(F)B(F,F)-F | (1-3-1) | 5% |
| 4-GB(F,F)XB(F)B(F,F)-F | (1-3-1) | 12% |
| 5-GB(F,F)XB(F)B(F,F)-F | (1-3-1) | 12% |
| 1-BB(F,F)XB(F,F)-F | (2-15-1) | 5% |
| 3-BB(F,F)XB(F,F)-F | (2-15-1) | 5% |
| 4-B(F)B(F,F)B(F,F)XB(F,F)-F | (2-19-3) | 3% |
| 5-B(F)B(F,F)B(F,F)XB(F,F)-F | (2-19-3) | 5% |
| 6-B(F)B(F,F)B(F,F)XB(F,F)-F | (2-19-3) | 3% |
| 4-B(F)B(F,CL)B(F,F)XB(F,F)-CF3 | (3-1-2) | 6% |
| 6-B(F)B(F,CL)B(F,F)XB(F,F)-CF3 | (3-1-2) | 5% |
| V2-BB-1 | (4-3-1) | 8% |
| 1-BB-3 | (4-3-1) | 7% |
| 3-HHEBH-3 | (4-9-1) | 4% |
| 5-HBBH-3 | (4-10-1) | 3% |
| 3-HB(F)HH-5 | (4-11-1) | 3% |
| 5-HB(F)BH-3 | (4-12-1) | 3% |
| 5-HBB(F)B-2 | (4-13-1) | 5% |
| 5-HBBH-1O1 | (—) | 3% |

NI=90.4° C.; Δn=0.156; Δ∈=50.2; γ1=513.4 mPa·s; VHR-1=97.5%; VHR-2=97.8%.

The compositions in Example 1 to Example 8 had a higher maximum temperature, a larger dielectric anisotropy and a larger optical anisotropy in comparison with the compounds in Comparative Example 1 and Comparative Example 2. Therefore, the liquid crystal composition according to the invention has superb characteristics in comparison with the liquid crystal composition presented in Patent literature Nos. 1 and 2.

Example 9

| | | |
|---|---|---|
| 3-GB(F)B(F,F)XB(F,F)-F | (1-2-1) | 4.0% |
| 4-GB(F)B(F,F)XB(F,F)-F | (1-2-1) | 4.0% |
| 5-GB(F)B(F,F)XB(F,F)-F | (1-2-1) | 4.0% |
| 2-GB(F,F)XB(F)B(F,F)-F | (1-3-1) | 12.0% |
| 3-GB(F,F)XB(F)B(F,F)-F | (1-3-1) | 12.0% |
| 4-GB(F,F)XB(F)B(F,F)-F | (1-3-1) | 12.0% |
| 5-GB(F,F)XB(F)B(F,F)-OCF3 | (1-3) | 20.0% |
| 4-BB(F)B(F,F)XB(F,F)-CF3 | (2-19-2) | 3.2% |
| 5-BB(F)B(F,F)XB(F,F)-CF3 | (2-19-2) | 3.2% |
| 4-B(F)B(F,F)B(F,F)XB(F,F)-F | (2-19-3) | 2.4% |
| 5-B(F)B(F,F)B(F,F)XB(F,F)-F | (2-19-3) | 2.4% |
| 3-B(F)B(F,F)B(F,F)XB(F,F)-CF3 | (2-19-4) | 3.2% |
| 4-B(F)B(F,F)B(F,F)XB(F,F)-CF3 | (2-19-4) | 3.2% |
| 5-B(F)B(F,F)B(F,F)XB(F,F)-CF3 | (2-19-4) | 3.2% |
| 6-B(F)B(F,F)B(F,F)XB(F,F)-CF3 | (2-19-4) | 3.2% |
| 3(1)1-B(F)B(F,F)B(F,F)XB(F,F)-CF3 | (2-19-4) | 8.0% |

NI=82.4° C.

Example 10

| | | |
|---|---|---|
| 3-GB(F)B(F,F)XB(F,F)-F | (1-2-1) | 3.5% |
| 4-GB(F)B(F,F)XB(F,F)-F | (1-2-1) | 3.5% |
| 5-GB(F)B(F,F)XB(F,F)-F | (1-2-1) | 3.5% |
| 2-GB(F,F)XB(F)B(F,F)-F | (1-3-1) | 10.5% |
| 3-GB(F,F)XB(F)B(F,F)-F | (1-3-1) | 10.5% |
| 4-GB(F,F)XB(F)B(F,F)-F | (1-3-1) | 10.5% |
| 4-GB(F,F)XB(F)B(F,F)-CF3 | (1-3) | 30.0% |
| 4-BB(F)B(F,F)XB(F,F)-CF3 | (2-19-2) | 2.8% |
| 5-BB(F)B(F,F)XB(F,F)-CF3 | (2-19-2) | 2.8% |
| 4-B(F)B(F,F)B(F,F)XB(F,F)-F | (2-19-3) | 2.1% |
| 5-B(F)B(F,F)B(F,F)XB(F,F)-F | (2-19-3) | 2.1% |
| 3-B(F)B(F,F)B(F,F)XB(F,F)-CF3 | (2-19-4) | 2.8% |
| 4-B(F)B(F,F)B(F,F)XB(F,F)-CF3 | (2-19-4) | 2.8% |
| 5-B(F)B(F,F)B(F,F)XB(F,F)-CF3 | (2-19-4) | 2.8% |
| 6-B(F)B(F,F)B(F,F)XB(F,F)-CF3 | (2-19-4) | 2.8% |
| 3(1)1-B(F)B(F,F)B(F,F)XB(F,F)-CF3 | (2-19-4) | 7.0% |

Example 11

| | | |
|---|---|---|
| 3-GB(F)B(F,F)XB(F,F)-F | (1-2-1) | 4.0% |
| 4-GB(F)B(F,F)XB(F,F)-F | (1-2-1) | 4.0% |
| 5-GB(F)B(F,F)XB(F,F)-F | (1-2-1) | 4.0% |
| 2-GB(F,F)XB(F)B(F,F)-F | (1-3-1) | 12.0% |
| 3-GB(F,F)XB(F)B(F,F)-F | (1-3-1) | 12.0% |
| 4-GB(F,F)XB(F)B(F,F)-F | (1-3-1) | 12.0% |
| 2-GB(F,F)XB(F)B(F,F)-CL | (1-3) | 20.0% |
| 4-BB(F)B(F,F)XB(F,F)-CF3 | (2-19-2) | 3.2% |
| 5-BB(F)B(F,F)XB(F,F)-CF3 | (2-19-2) | 3.2% |
| 4-B(F)B(F,F)B(F,F)XB(F,F)-F | (2-19-3) | 2.4% |
| 5-B(F)B(F,F)B(F,F)XB(F,F)-F | (2-19-3) | 2.4% |
| 3-B(F)B(F,F)B(F,F)XB(F,F)-CF3 | (2-19-4) | 3.2% |
| 4-B(F)B(F,F)B(F,F)XB(F,F)-CF3 | (2-19-4) | 3.2% |
| 5-B(F)B(F,F)B(F,F)XB(F,F)-CF3 | (2-19-4) | 3.2% |
| 6-B(F)B(F,F)B(F,F)XB(F,F)-CF3 | (2-19-4) | 3.2% |
| 3(1)1-B(F)B(F,F)B(F,F)XB(F,F)-CF3 | (2-19-4) | 8.0% |

NI=78.6° C.

Example 12

| | | |
|---|---|---|
| 3-GB(F)B(F,F)XB(F,F)-F | (1-2-1) | 4.0% |
| 4-GB(F)B(F,F)XB(F,F)-F | (1-2-1) | 4.0% |
| 5-GB(F)B(F,F)XB(F,F)-F | (1-2-1) | 4.0% |
| 2-GB(F,F)XB(F)B(F,F)-F | (1-3-1) | 12.0% |
| 3-GB(F,F)XB(F)B(F,F)-F | (1-3-1) | 12.0% |
| 4-GB(F,F)XB(F)B(F,F)-F | (1-3-1) | 12.0% |
| 2-GB(F,F)XB(F)B(F)-OCF3 | (1-3) | 20.0% |
| 4-BB(F)B(F,F)XB(F,F)-CF3 | (2-19-2) | 3.2% |
| 5-BB(F)B(F,F)XB(F,F)-CF3 | (2-19-2) | 3.2% |
| 4-B(F)B(F,F)B(F,F)XB(F,F)-F | (2-19-3) | 2.4% |
| 5-B(F)B(F,F)B(F,F)XB(F,F)-F | (2-19-3) | 2.4% |
| 3-B(F)B(F,F)B(F,F)XB(F,F)-CF3 | (2-19-4) | 3.2% |
| 4-B(F)B(F,F)B(F,F)XB(F,F)-CF3 | (2-19-4) | 3.2% |
| 5-B(F)B(F,F)B(F,F)XB(F,F)-CF3 | (2-19-4) | 3.2% |
| 6-B(F)B(F,F)B(F,F)XB(F,F)-CF3 | (2-19-4) | 3.2% |
| 3(1)1-B(F)B(F,F)B(F,F)XB(F,F)-CF3 | (2-19-4) | 8.0% |

NI=78.1° C.

Example 13

| | | |
|---|---|---|
| 3-GB(F)B(F,F)XB(F,F)-F | (1-2-1) | 4.0% |
| 4-GB(F)B(F,F)XB(F,F)-F | (1-2-1) | 4.0% |
| 5-GB(F)B(F,F)XB(F,F)-F | (1-2-1) | 4.0% |
| 2-GB(F,F)XB(F)B(F,F)-F | (1-3-1) | 12.0% |
| 3-GB(F,F)XB(F)B(F,F)-F | (1-3-1) | 12.0% |
| 4-GB(F,F)XB(F)B(F,F)-F | (1-3-1) | 12.0% |
| 2-GB(F,F)XB(F)B(F)-F | (1-3) | 20.0% |
| 4-BB(F)B(F,F)XB(F,F)-CF3 | (2-19-2) | 3.2% |
| 5-BB(F)B(F,F)XB(F,F)-CF3 | (2-19-2) | 3.2% |
| 4-B(F)B(F,F)B(F,F)XB(F,F)-F | (2-19-3) | 2.4% |
| 5-B(F)B(F,F)B(F,F)XB(F,F)-F | (2-19-3) | 2.4% |
| 3-B(F)B(F,F)B(F,F)XB(F,F)-CF3 | (2-19-4) | 3.2% |
| 4-B(F)B(F,F)B(F,F)XB(F,F)-CF3 | (2-19-4) | 3.2% |
| 5-B(F)B(F,F)B(F,F)XB(F,F)-CF3 | (2-19-4) | 3.2% |
| 6-B(F)B(F,F)B(F,F)XB(F,F)-CF3 | (2-19-4) | 3.2% |
| 3(1)1-B(F)B(F,F)B(F,F)XB(F,F)-CF3 | (2-19-4) | 8.0% |

NI=77.6° C.

Example 14

| | | |
|---|---|---|
| 3-GB(F)B(F,F)XB(F,F)-F | (1-2-1) | 8.0% |
| 4-GB(F)B(F,F)XB(F,F)-F | (1-2-1) | 8.0% |
| 5-GB(F)B(F,F)XB(F,F)-F | (1-2-1) | 7.0% |
| 2-GB(F,F)XB(F)B(F,F)-F | (1-3-1) | 17.0% |
| 3-GB(F,F)XB(F)B(F,F)-F | (1-3-1) | 15.0% |
| 4-GB(F,F)XB(F)B(F,F)-F | (1-3-1) | 15.0% |
| 4-GB(F,F)XB(F,F)B(F,F)-F | (1-3) | 15.0% |
| 3-B(F)B(F,F)B(F,F)XB(F,F)-CF3 | (2-19-4) | 3.7% |
| 4-B(F)B(F,F)B(F,F)XB(F,F)-CF3 | (2-19-4) | 3.7% |
| 5-B(F)B(F,F)B(F,F)XB(F,F)-CF3 | (2-19-4) | 3.8% |
| 6-B(F)B(F,F)B(F,F)XB(F,F)-CF3 | (2-19-4) | 3.8% |

NI=78.7° C.

INDUSTRIAL APPLICABILITY

The liquid crystal composition satisfies at least one of characteristics such as a high maximum temperature of a nematic phase, a low minimum temperature of the nematic phase, a small viscosity, a large optical anisotropy, a large dielectric anisotropy, a large elastic constant, a high stability to ultraviolet light and a high stability to heat, or has a suitable balance between at least two of the characteristics. The liquid crystal display device including such a composition is applied to constitute an AM device having a short response time, a large voltage holding ratio, a large contrast ratio, a long service life and so forth, and therefore can be used for a liquid crystal projector, a liquid crystal television and so forth.

What is claimed is:

1. A liquid crystal composition that has a nematic phase and contains at least one compound selected from the group of compounds represented by formula (1) as a first component and at least one compound selected from the group of compounds represented by formula (2) as a second component, in which a proportion of the first component is in a range of 25 wt % to 85 wt % based on a total weight of the liquid crystal composition:

(1)

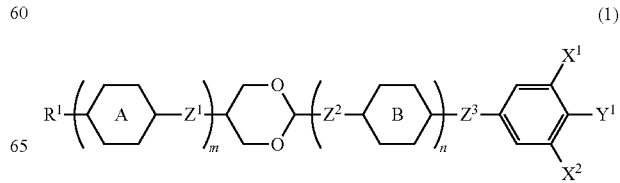

-continued

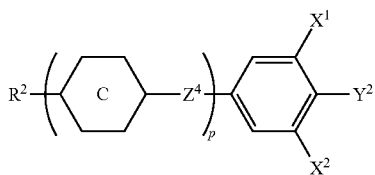
(2)

wherein $R^1$ and $R^2$ are independently alkyl having 1 to 12 carbons, alkoxy having 1 to 12 carbons, or alkenyl having 2 to 12 carbons; ring A, ring B and ring C are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 2,6,7-trioxabicyclo[2.2.2]octane-1,4-diyl or tetrahydropyran-2,5-diyl; $X^1$ and $X^2$ are independently hydrogen or fluorine; $Y^1$ and $Y^2$ are independently fluorine, chlorine, trifluoromethyl or trifluoromethoxy; $Z^1$, $Z^2$, $Z^3$ and $Z^4$ are independently a single bond, ethylene, carbonyloxy or difluoromethyleneoxy; m and n are 0, 1, 2 or 3, and a sum of m and n is 2 or 3; and p is 1, 2, 3 or 4.

2. The liquid crystal composition of claim 1, wherein the proportion of the first component is in a range of 25 wt % to 80 wt % based on the total weight of the liquid crystal composition.

3. The liquid crystal composition of claim 1, wherein the first component is at least one compound selected from the group of compounds represented by formula (1-1) to formula (1-5):

wherein $R^1$ is alkyl having 1 to 12 carbons, alkoxy having 1 to 12 carbons, or alkenyl having 2 to 12 carbons; $X^1$, $X^2$, $X^3$, $X^4$, $X^5$, $X^6$, $X^7$ and $X^8$ are independently hydrogen or fluorine; and $Y^1$ is fluorine, chlorine, trifluoromethyl or trifluoromethoxy.

4. The liquid crystal composition of claim 3, wherein the first component is at least one compound selected from the group of compounds represented by formula (1-2).

5. The liquid crystal composition of claim 3, wherein the first component is at least one compound selected from the group of compounds represented by formula (1-3).

6. The liquid crystal composition of claim 1, wherein the second component is at least one compound selected from the group of compounds represented by formula (2-1) to formula (2-20):

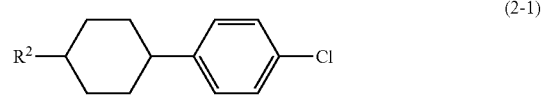
(2-1)

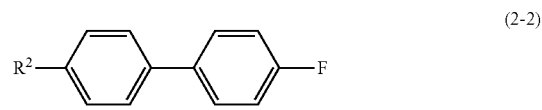
(2-2)

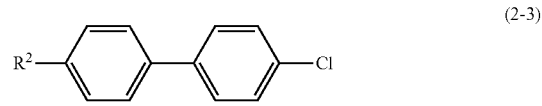
(2-3)

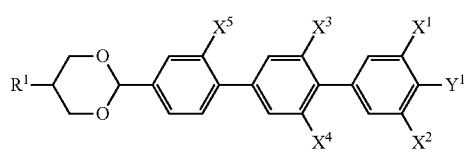
(1-1)

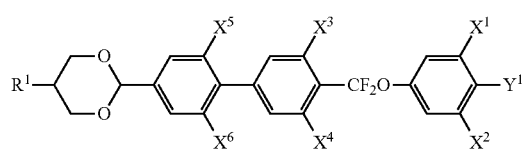
(1-2)

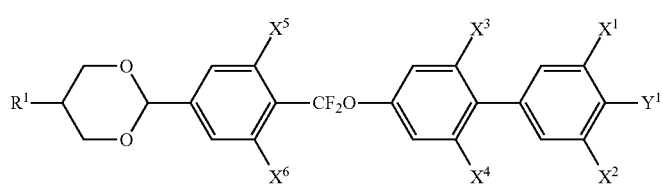
(1-3)

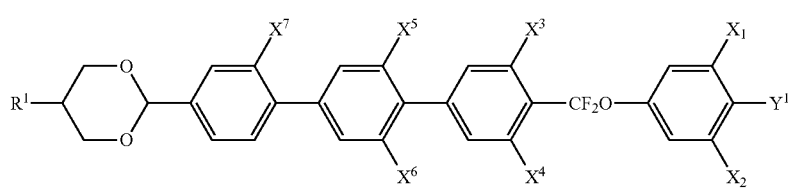
(1-4)

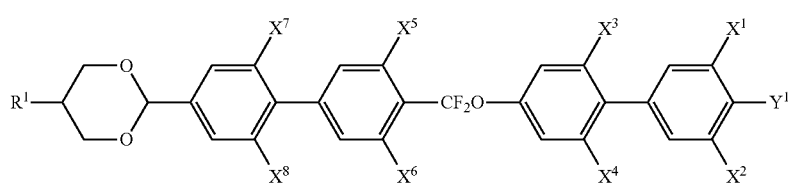
(1-5)

wherein $R^2$ is alkyl having 1 to 12 carbons, alkoxy having 1 to 12 carbons, or alkenyl having 2 to 12 carbons; $X^9$, $X^{10}$, $X^{11}$, $X^{12}$, $X^{13}$, $X^{14}$, $X^{15}$ and $X^{16}$ are independently hydrogen or fluorine; and $Y^3$ is fluorine, chlorine, trifluoromethyl, or trifluoromethoxy.

7. The liquid crystal composition of claim 6, wherein the second component is at least one compound selected from the group of compounds represented by formula (2-18).

8. The liquid crystal composition of claim 6, wherein the second component is at least one compound selected from the group of compounds represented by formula (2-19).

9. The liquid crystal composition of claim 2, wherein the proportion of the first component is in the range of 25 wt % to 80 wt %, and a proportion of the second component is in a range of 20 wt % to 75 wt %, based on the total weight of the liquid crystal composition.

10. The liquid crystal composition of claim 2, wherein the proportion of the first component is in a range of 30 wt % to 75 wt %, and a proportion of the second component is in a range of 25 wt % to 70 wt %, based on the total weight of the liquid crystal composition.

11. The liquid crystal composition of claim 1, further containing at least one compound selected from the group of compounds represented by formula (3) as a third component:

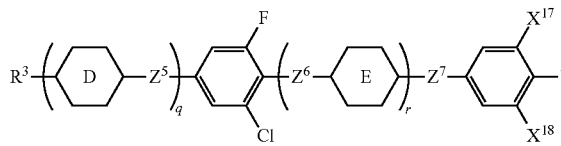

(3)

wherein $R^3$ is alkyl having 1 to 12 carbons, alkoxy having 1 to 12 carbons, or alkenyl having 2 to 12 carbons; ring D and ring E are independently 1,4-cyclohexylene, 1,4-phenylene, 2-fluoro-1,4-phenylene, 3-fluoro-1,4-phenylene, 3,5-difluoro-1,4-phenylene, pyrimidine-2,5-diyl, 2,6,7-trioxabicyclo[2.2.2]octane-1,4-diyl or tetrahydropyran-2,5-diyl; $X^{17}$ and $X^{18}$ are independently hydrogen or fluorine; $Y^4$ is fluorine, chlorine, trifluoromethyl or trifluoromethoxy; $Z^5$, $Z^6$ and $Z^7$ are independently a single bond, ethylene, carbonyloxy or difluoromethyleneoxy; and q and r are 0, 1, 2 or 3, and a sum of q and r is 1, 2 or 3.

12. The liquid crystal composition of claim 11, wherein the third component is at least one compound selected from the group of compounds represented by formula (3-1) to formula (3-3):

wherein $R^3$ is alkyl having 1 to 12 carbons, alkoxy having 1 to 12 carbons, or alkenyl having 2 to 12 carbons; $X^{19}$, $X^{20}$, $X^{21}$, $X^{22}$, $X^{23}$, $X^{24}$ and $X^{25}$ are independently hydrogen or fluorine; and $Y^4$ is fluorine, chlorine, trifluoromethyl or trifluoromethoxy.

13. The liquid crystal composition of claim 11, wherein a proportion of the third component is in a range of 10 wt % to 50 wt % based on the total weight of the liquid crystal composition.

14. The liquid crystal composition of claim 1, further containing at least one compound selected from the group of compounds represented by formula (4) as a fourth component:

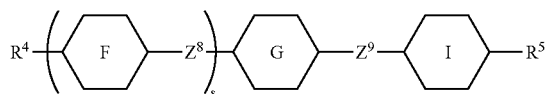

(4)

wherein $R^4$ and $R^5$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring F, ring G and ring I are independently 1,4-cyclohexylene, 1,4-phenylene, 2-fluoro-1,4-phenylene or 3-fluoro-1,4-phenylene; $Z^8$ and $Z^9$ are independently a single bond, ethylene, methyleneoxy or carbonyloxy; and s is 0, 1 or 2.

15. The liquid crystal composition of claim 14, wherein the fourth component is at least one compound selected from the group of compounds represented by formula (4-1) to formula (4-13):

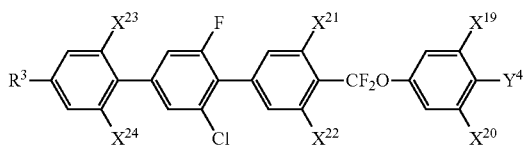

(3-1)

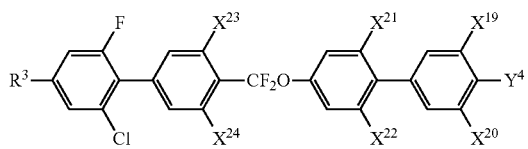

(3-2)

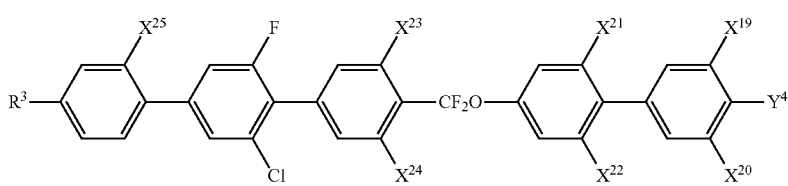

(3-3)

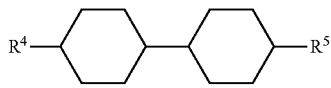 (4-1)

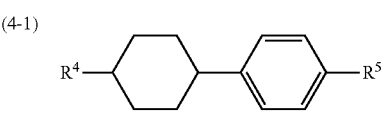 (4-2)

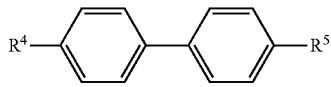 (4-3)

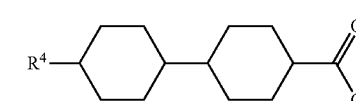 (4-4)

 (4-5)

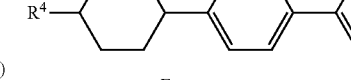 (4-6)

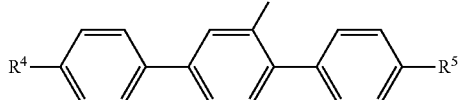 (4-7)

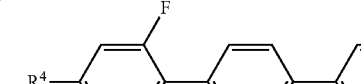 (4-8)

 (4-9)

 (4-10)

 (4-11)

 (4-12)

 (4-13)

wherein $R^4$ and $R^5$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

16. The liquid crystal composition of claim 14, wherein a proportion of the fourth component is in a range of 3 wt % to 35 wt % based on the total weight of the liquid crystal composition.

17. The liquid crystal composition of claim 1, of which a maximum temperature of nematic phase is 70° C. or higher, an optical anisotropy (25° C.) at a wavelength of 589 nanometers is 0.08 or more, and a dielectric anisotropy (25° C.) at a frequency of 1 kHz is 2 or more.

18. A liquid crystal display device including the liquid crystal composition of claim 1.

19. The liquid crystal display device of claim 18, of which an operating mode is a TN mode, an OCB mode, an IPS mode, an FFS mode, a PSA mode or an FPA mode, and a driving mode is an active matrix mode.

\* \* \* \* \*